United States Patent
Sakamoto et al.

(10) Patent No.: US 9,401,734 B2
(45) Date of Patent: Jul. 26, 2016

(54) WIRELESS COMMUNICATION SYSTEM AND COMMUNICATION DEVICE

(71) Applicant: Panasonic Intellectual Property Management Co., Ltd., Osaka (JP)

(72) Inventors: Satoru Sakamoto, Fukuoka (JP); Katsuya Abe, Fukuoka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/631,678

(22) Filed: Feb. 25, 2015

(65) Prior Publication Data

US 2015/0270887 A1  Sep. 24, 2015

Related U.S. Application Data

(60) Provisional application No. 61/945,383, filed on Feb. 27, 2014.

(30) Foreign Application Priority Data

Dec. 1, 2014  (JP) ................................ 2014-243221

(51) Int. Cl.
*H04B 7/00* (2006.01)
*H04B 1/38* (2015.01)
*H04B 7/155* (2006.01)

(52) U.S. Cl.
CPC .............. *H04B 1/38* (2013.01); *H04B 7/15507* (2013.01)

(58) Field of Classification Search
CPC ........... H04B 7/14; H04B 1/38; H04W 84/20; A01B 12/006

USPC ................................. 455/500, 502, 507, 41.3
See application file for complete search history.

(56) References Cited

U.S. PATENT DOCUMENTS

| | | | | |
|---|---|---|---|---|
| 4,682,351 A * | 7/1987 | Makino | ............ | H04M 1/727 455/411 |
| 5,960,367 A * | 9/1999 | Kita | ............ | H04B 1/38 455/11.1 |
| 2002/0071435 A1* | 6/2002 | Bolgiano | ............ | G01S 5/14 370/394 |
| 2010/0157790 A1* | 6/2010 | Pedersen | ............ | H01L 1/004 370/216 |
| 2010/0158292 A1* | 6/2010 | Pedersen | ............ | H04R 25/55 381/315 |
| 2011/0045822 A1* | 2/2011 | Hidaka | ............ | H04W 40/24 455/424 |

(Continued)

FOREIGN PATENT DOCUMENTS

JP   2002-223491 A   8/2002

*Primary Examiner* — Md Talukder
(74) *Attorney, Agent, or Firm* — Seed IP Law Group PLLC

(57) ABSTRACT

In a wireless communication system, transmitters that transmit data, receivers that receive data, and repeaters that relay data communicate with one another in a wireless manner. The transmitter wirelessly communicates with the receiver by using first slave-device identification information for performing communication as a slave device of the receiver. The receiver wirelessly communicates with the transmitter by using first master-device identification information for performing communication as a master device of the transmitter, and wirelessly communicates with the repeater by using second slave-device identification information for performing communication as a slave device of the repeater. The repeater wirelessly communicates with the receiver by using second master-device identification information for performing communication as a master device of the receiver.

15 Claims, 21 Drawing Sheets

(56) References Cited

U.S. PATENT DOCUMENTS

| | | | | |
|---|---|---|---|---|
| 2012/0310394 A1* | 12/2012 | El-Hoiydi | H04B 7/0667 | 700/94 |
| 2012/0310395 A1* | 12/2012 | El-Hoiydi | H04W 48/16 | 700/94 |
| 2014/0135880 A1* | 5/2014 | Baumgartner | A61N 1/37288 | 607/115 |
| 2014/0233527 A1* | 8/2014 | Gehring | H04R 25/554 | 370/330 |
| 2014/0334375 A1* | 11/2014 | Sugitani | H04W 84/20 | 370/315 |
| 2015/0249482 A1* | 9/2015 | Czaja | H04B 5/0031 | 455/41.1 |
| 2015/0270887 A1* | 9/2015 | Sakamoto | H04B 7/15507 | 455/7 |

\* cited by examiner

ID OF DECT_AP

MASTER-DEVICE ID OF RECEIVER

SLAVE-DEVICE ID OF
RECEIVER/SLAVE-DEVICE ID OF MICROPHONE

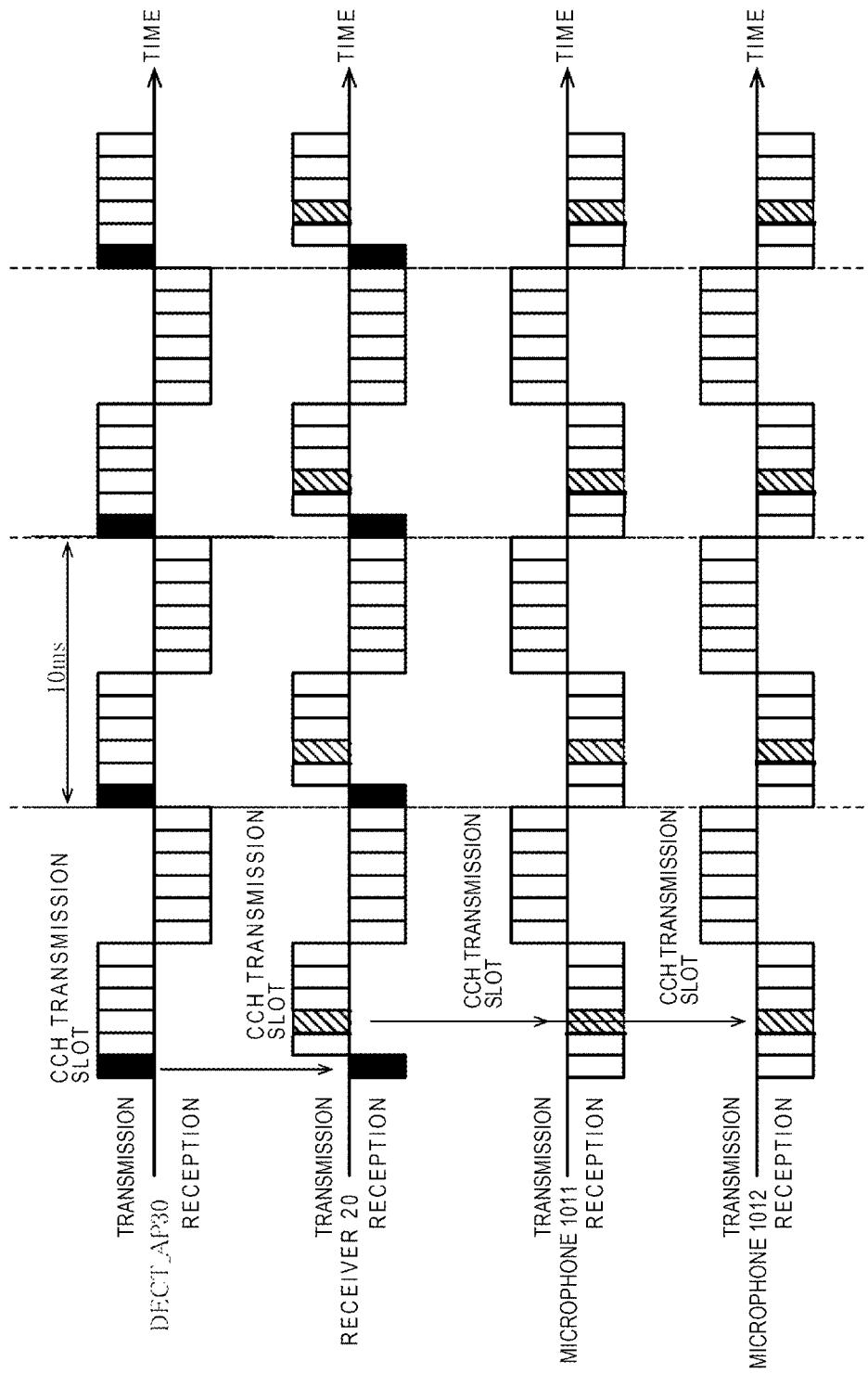

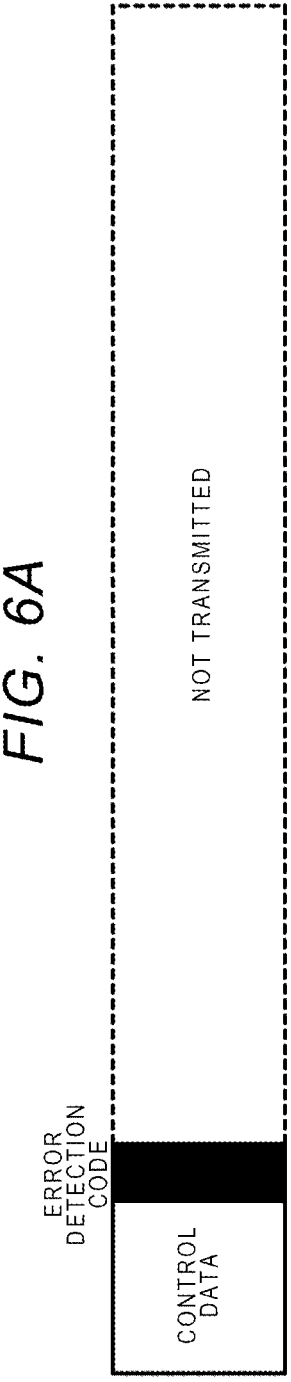
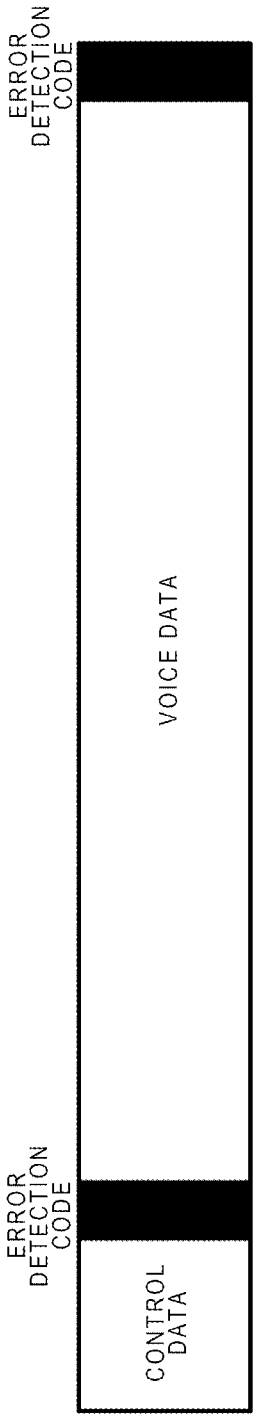

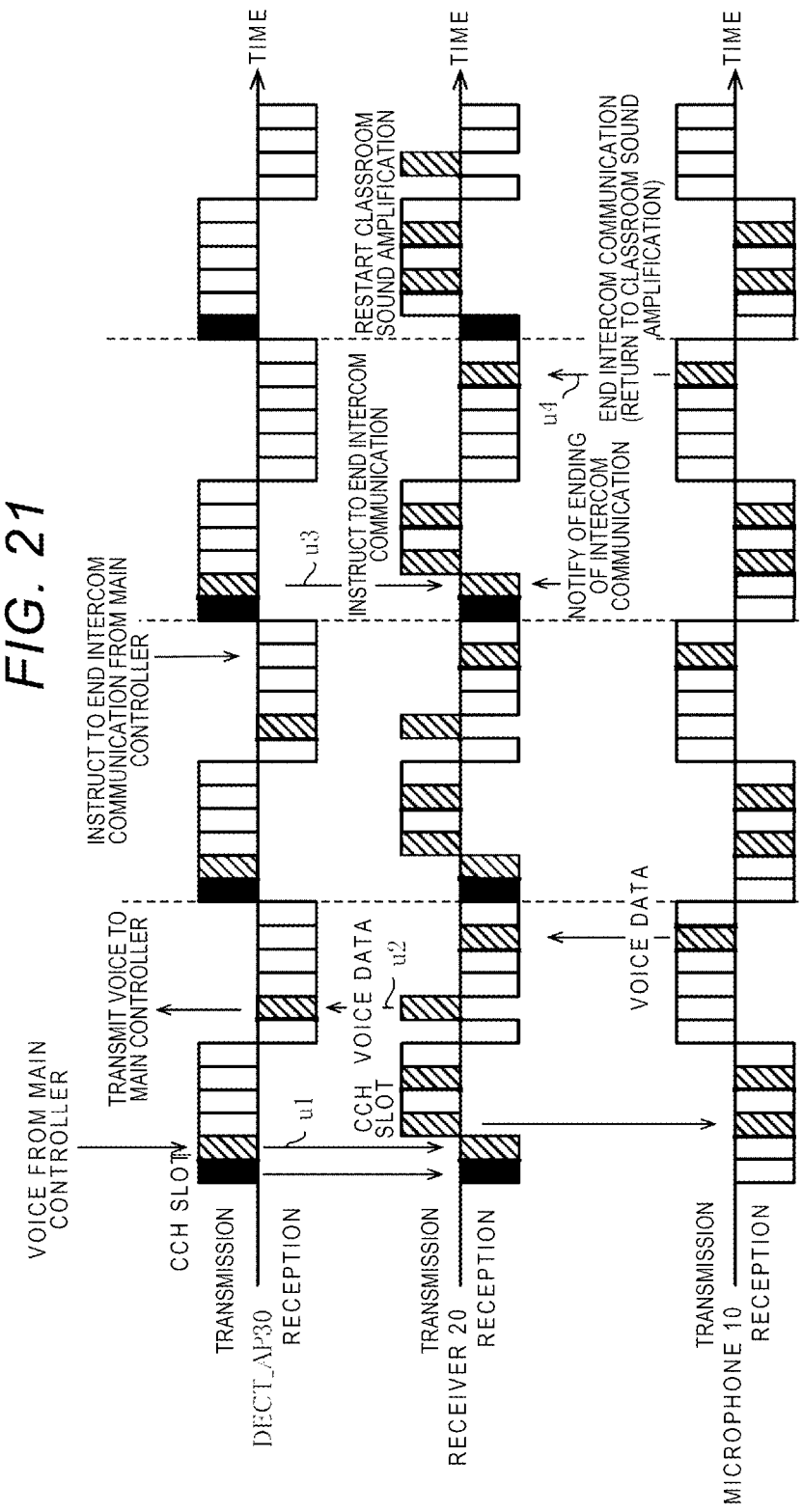

WIRELESS COMMUNICATION SYSTEM AND COMMUNICATION DEVICE

BACKGROUND OF THE INVENTION

1. Field of the Invention

The present invention relates to a wireless communication system and a communication device.

2. Description of the Related Art

In the related art, a microphone system that uses infrared rays is known (for example, Japanese Patent Unexamined Publication No. 2002-223491). In this microphone system, a plurality of light receiving sensors that receive light from an infrared microphone is provided, one terminals of mixing resistors are respectively connected to output terminals of the plurality of light receiving sensors, other terminals of the mixing resistors are commonly connected. A cable connected commonly to the other terminals is connected to a sensor input terminal of a receiver, and thus, only one cable wiring is used between the light receiving sensors and the receiver.

In the microphone system of Japanese Patent Unexamined Publication No. 2002-223491, since infrared rays are used, the infrared microphone and the light receiving sensors may be needed for each of different regions (for example, different classrooms) that are spatially partitioned. When a central control room controls all of devices present in the different regions, since wirings are needed for all of the different regions, it may be difficult to implement communication between the devices provided in the respective regions with a simple configuration.

In view of the foregoing, the present invention provides a wireless communication system and a communication device that can implement communication between devices provided in different regions that are spatially partitioned with a simple configuration.

SUMMARY OF THE INVENTION

According to an aspect of the present invention, there is provided a wireless communication system in which transmitters that transmit data, receivers that receive data, and repeaters that relay data communicate with one another in a wireless manner by exchanging identification information items thereof. The transmitter includes a first communication unit that wirelessly communicates with the receiver by using first slave-device identification information for performing communication as a slave device of the receiver, the receiver includes a second communication unit that wirelessly communicates with the transmitter by using first master-device identification information for performing communication as a master device of the transmitter, and that wirelessly communicates with the repeater by using second slave-device identification information for performing communication as a slave device of the repeater, and the repeater includes a third communication unit that wirelessly communicates with the receiver by using second master-device identification information for performing communication as a master device of the receiver.

According to another aspect of the present invention, there is provided a communication device that is wirelessly connected to a transmitter that transmits data and a repeater that relays data, and transmits and receives data. The communication device includes a communication unit that wirelessly communicates with the transmitter by using master-device identification information for performing communication as a master device of the transmitter, and wirelessly communicates with the repeater by using slave-device identification information for performing communication as a slave device of the repeater. The master-device identification information and the slave-device identification information are different information items from each other.

BRIEF DESCRIPTION OF DRAWINGS

FIG. 5 is a timing chart showing a configuration example of a slot on standby according to the exemplary embodiment;

FIGS. 6A to 6C are schematic diagrams showing configuration examples of control channel (CCH) data;

FIG. 21 is a timing chart showing a slot configuration example when the operational mode is returned to the classroom sound amplification from the intercom communication according to the exemplary embodiment;

DETAILED DESCRIPTION OF THE PREFERRED EMBODIMENT

Hereinafter, an exemplary embodiment of the present invention will be described with reference to the drawings.

A wireless communication system according to the following exemplary embodiment is applied to, for example, a microphone system (sound absorption system) that is provided in a plurality of classrooms. A classroom is an example of a spatially partitioned region. A spatially partitioned region refers to a region partitioned by a shield such as a wall, and, for example, it is difficult for infrared rays to perform communication to outside this region due to the shield.

Figure 1:
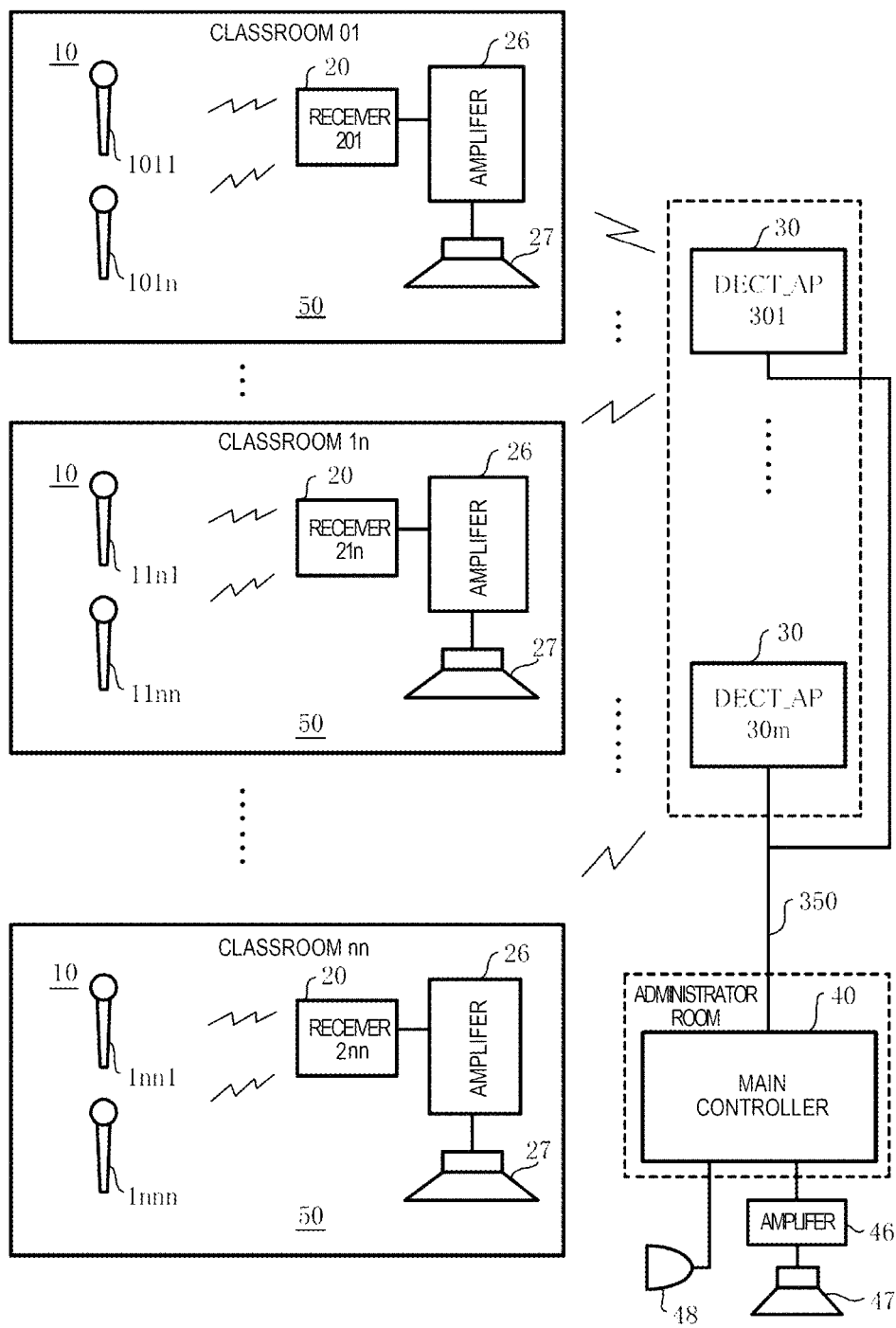
FIG. 1 is a schematic diagram showing a schematic configuration example of a microphone system according to an exemplary embodiment.

FIG. 1 is a schematic diagram showing a schematic configuration example of microphone system 5 according to the exemplary embodiment. Microphone system 5 includes multiple sound amplification systems 50 that are provided in the respective classrooms, multiple DECT_APs 30, and main controller 40.

Digital enhanced cordless telecommunications (DECT)_access point (AP) 30 is an example of a repeater that relays data, and is an example of an access point.

For example, one classroom is set as one group, and sound amplification system 50 is provided for each group. Sound amplification system 50 includes multiple microphones 10, receiver 20, amplifier 26, and speaker 27. Microphone 10 is an example of a transmitter that transmits data. A plurality of groups may be provided in one classroom.

When multiple microphones 10 are distinguished from one another, reference numerals are assigned as follows. For example, microphones 10 that are provided in classroom 1n are represented as microphones 11n1 to 11nn. The first number "1" represents a microphone. The second and third numbers "1n" represent a classroom number. The fourth numbers from "1" to "n" represent a microphone number.

When receivers 20 are distinguished from one another, reference numerals are assigned as follows. For example, one receiver 20 is provided in each classroom. The receivers that are provided in classrooms 01, 1n, n1 and nn are respectively represented as receivers 201, 21n, 2n1 and 2nn. The first number "2" represents a receiver. The second and third numbers represent a classroom number.

For example, multiple DECT_APs 30 are provided outside the classrooms (for example, corridor). Here, m number of DECT_APs 30 is provided, and DECT_APs from DECT_AP 301 to DECT_AP 30m are distinguished.

For example, multiple receivers 201 to 20n that are respectively provided in classrooms 01 to 0n are connected to one DECT_AP 301. Multiple receivers 2n1 to 2nn that are respectively provided in classroom n1 to nn are connected to one DECT_AP 30m. That is, as many identifiers (IDs) of receivers 20 are registered in each DECT_AP 30 as the number of receivers connected to each DECT_AP. The ID is an example of identification information.

Receiver 20 whose ID is registered in DECT_AP 30 has an ID as a slave device of DECT.

Multiple DECT_APs 30 are connected to main controller 40 provided in an administrator room through local area network (LAN) cable 350. Main controller 40 is an example of an information processing device.

If small scale broadcasting (for example, in-school broadcasting) to be described below is performed, when voice data is sent from main controller 40 to DECT_APs 30 and is sent from DECT_APs 30 to receivers 20, voice is output in the classrooms from speakers 27 connected to receivers 20. In this case, for example, control unit 45 (see FIG. 2) of main controller 40 can perform control such that voice data is not sent to the classrooms that do not broadcast voice. That is, main controller 40 can specify the receiver provided in the classroom as a target of the small scale broadcasting.

Since the respective microphones have the same specification, when it is not necessary to particularly distinguish the microphones from one another, the microphones are described as microphones 10. Since the respective receivers have the same specification, when it is not necessary to particularly distinguish the receivers from one another, the receivers are described as receivers 20. Since the respective DECT_APs have the same specification, when it is not necessary to particularly distinguish the DECT_APs from one another, the DECT_APs are described as DECT_APs 30.

A time division system is used as a communication system of communication performed between microphones 10 and receiver 20. The time division system includes, for example, a time division multiple access (TDMA) system. For example, digital enhanced cordless telecommunications (DECT) is used for communication that uses the time division system.

In the communication system of DECT, when microphone 10 uses a certain communication slot (simply referred to as a "slot"), another microphone does not use the same slot. In the present exemplary embodiment, it will be described that one receiver 20 can be connected to two microphones 10. One receiver 20 may be connected to two or more microphones, and the number of microphones depends on, for example, a capability of a central processing unit (CPU) of receiver 20.

IDs of microphones 10 are registered in, for example, receiver 20, as slave devices of DECT. Receiver 20 as a registration destination of microphones 10 has an ID (master-device identification information) as a master device of the DECT.

Figure 2:
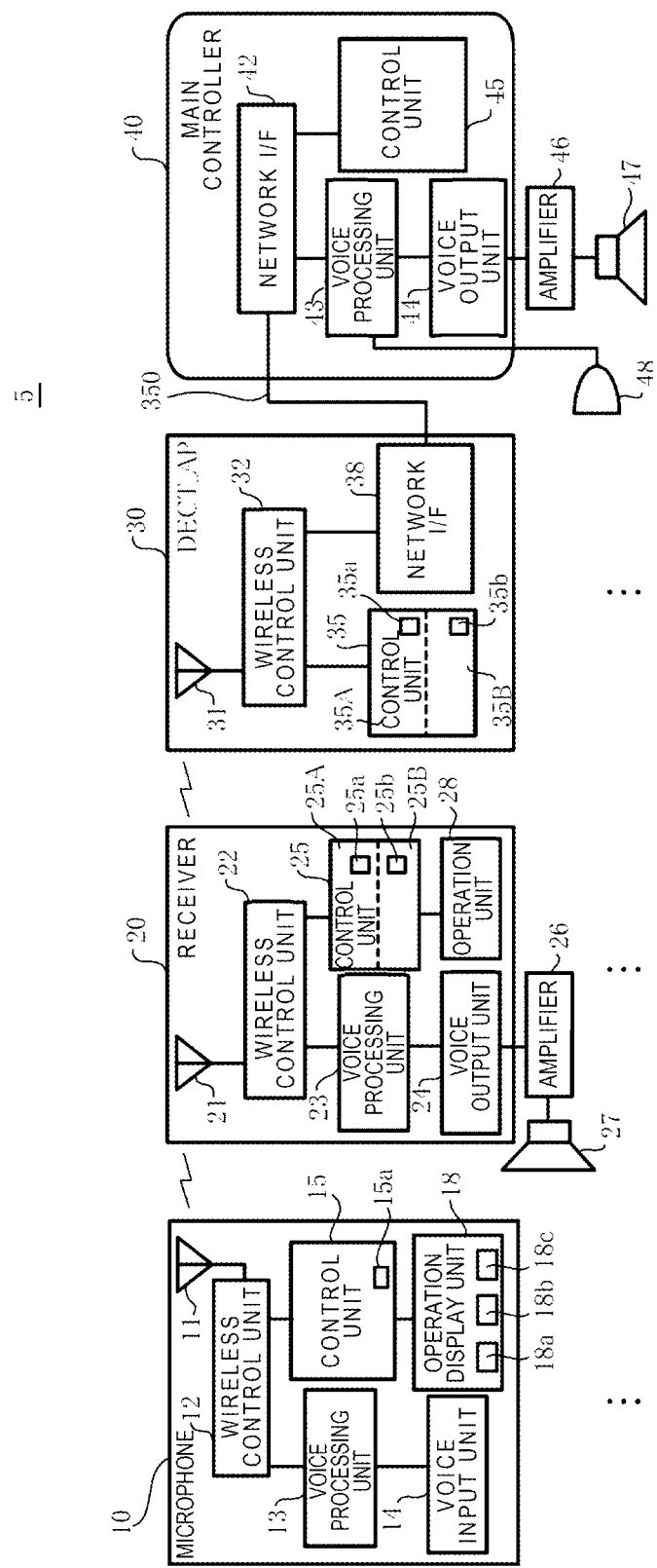
FIG. 2 is a block diagram showing a configuration example of the respective devices of the microphone system according to the exemplary embodiment.

FIG. 2 is a block diagram showing a configuration example of microphone system 5. Microphone system 5 includes multiple sound amplification systems 50, multiple DECT_APs 30, and main controller 40.

For example, sound amplification system 50 is provided in each classroom, and includes multiple microphones 10, receiver 20, amplifier 26, and speaker 27. At least one of amplifier 26 and speaker 27 may be included in receiver 20 and may be separately provided from receiver 20.

Microphone 10 includes antenna 11, wireless control unit 12, voice processing unit 13, voice input unit 14, control unit 15, and operation display unit 18. The respective microphones 10 have the same configuration.

Wireless control unit 12 is wirelessly connected to receiver 20 through antenna 11, and performs wireless communication. Wireless control unit 12 is an example of a first communication unit.

Voice processing unit 13 processes a voice signal input from voice input unit 14. In the present exemplary embodiment, the "voice" is not limited to a voice produced by a human being, and broadly includes sounds such as the sound of a musical instrument and a buzzer sound.

Control unit 15 includes, for example, a central processing unit (CPU), a read only memory (ROM), and a random access memory (RAM). For example, the CPU realizes the respective functions of control unit 15 by executing programs stored in the ROM.

Control unit 15 controls the entire microphone 10. Control unit 15 includes storage section 15a, and an identifier (ID) of the microphone is stored in the storage section. This ID is registered as a slave-device ID in receiver 20 at the time of the registration. Storage section 15a stores an ID (ID as a master device) of receiver 20 in which the microphone is registered by a registration process.

Operation display unit 18 includes, for example, registration button 18a operated by an operator, call button 18b used to start a call, and light emitting diode (LED) 18c that informs of various information.

Receiver 20 includes antenna 21, wireless control unit 22, voice processing unit 23, voice output unit 24, control unit 25, and operation unit 28.

Wireless control unit 22 is wirelessly connected to DECT_AP 30 and microphones 10 through antenna 21, and performs wireless communication. For example, wireless control unit 22 performs an inversion operation of a slot. Wireless control unit 22 is an example of a second communication unit.

Voice processing unit 23 processes a voice signal obtained through wireless control unit 22, and outputs the processed voice signal to voice output unit 24. Voice output unit 24 outputs the voice signal from voice processing unit 23 to amplifier 26.

Amplifier 26 amplifies the voice signal from voice output unit 24. Speaker 27 produces the voice signal from amplifier 26 (outputs voice). Operation unit 28 receives various operations. Operation unit 28 includes, for example, registration button 28a, and receives a registration operation or the like by an operator who operates receiver 20.

Control unit 25 includes, for example, a CPU, a ROM, and a RAM. For example, the CPU realizes the respective functions of control unit 25 by executing programs stored in the ROM.

Control unit 25 controls the entire receiver 20. Control unit 25 includes a microphone control section 25A that controls connection with microphones 10 and stores an ID as a master device in storage section 25a. Storage section 25a stores IDs (IDs as slave devices) of microphones 10 registered in receiver 20 by a registration process.

Control unit 25 includes AP control section 25B that controls connection with DECT_AP 30, and stores an ID as a slave device in storage section 25b. Storage section 25b stores an ID (ID as a master device) of DECT_AP 30 in which the receiver is registered by a registration process.

For example, control unit 25 sets an operational mode, and processes data on the basis of the operational mode. For example, control unit 25 determines a transmission destination and a reception destination of voice data and whether to reproduce or output voice data on the basis of the operational mode. The operational mode includes, for example, a classroom sound amplification mode, a small scale broadcasting mode, and an intercom communication mode to be described below.

Control unit 25 functions as a first synchronization unit that performs synchronization with microphones 10 registered in receiver 20.

DECT_AP 30 includes antenna 31, wireless control unit 32, control unit 35, and network I/F 38.

Wireless control unit 32 is wirelessly connected to receivers 20 through antenna 31, and performs wireless communication. Wireless control unit 32 is an example of a third communication unit. For example, in order to perform synchronization with receivers 20, wireless control unit 32 transmits control channel (CCH) signals using a predetermined (for example, initial) slot.

Control unit 35 includes, for example, a CPU, a ROM, and a RAM. For example, the CPU realizes the respective functions of control unit 35 by executing programs stored in the ROM.

Control unit 35 controls the entire DECT_AP 30. Control unit 35 includes control section 35A that controls connection with receivers 20 and stores an ID as a master device in storage section 35a. Storage section 35a stores IDs (IDs as slave devices) of receivers 20 registered in DECT_AP 30 by a registration process.

Control unit 35 includes network control section 35B that controls connection with main controller 40 via a network and stores predetermined identification information (for example, MAC address) as an ID in storage section 35b.

Control unit 35 functions as a second synchronization unit that performs synchronization with receivers 20 registered in DECT_AP 30.

Network interface (I/F) 38 is connected to main controller 40 through LAN cable 35. The network interface may perform wireless communication by wireless LAN communication with main controller 40 without LAN cable 350.

Main controller 40 includes network I/F 42, voice processing unit 43, voice output unit 44, and control unit 45.

Network I/F 42 is connected to DECT_APs 30 through LAN cable 350. The network I/F may perform wireless communication by wireless LAN communication with DECT_APs 30 without LAN cable 350.

Control unit 45 controls connection with DECT_APs 30 via a network. Control unit 45 includes, for example, a CPU, a ROM, and a RAM. For example, the CPU realizes the respective functions of control unit 45 by executing programs stored in the ROM.

Voice processing unit 43 processes a voice signal input from microphone 48, and outputs the processed voice signal to voice output unit 44.

Voice output unit 44 outputs the voice signal from voice processing unit 43 to amplifier 46. Amplifier 46 amplifies the voice signal from voice output unit 44. Speaker 47 produces the voice signal from amplifier 46 (outputs voice). For example, in the small scale broadcasting mode or the intercom communication mode, microphone 48 receives a voice of an administrator located in the administrator room, as an input.

Figure 3A:
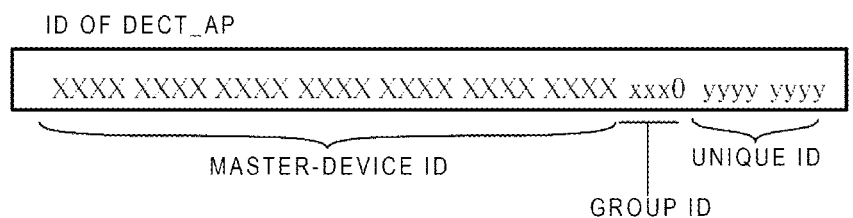
FIGS. 3A to 3C are schematic diagrams showing configuration examples of identifiers (IDs) according to the exemplary embodiment.
Figure 3B:
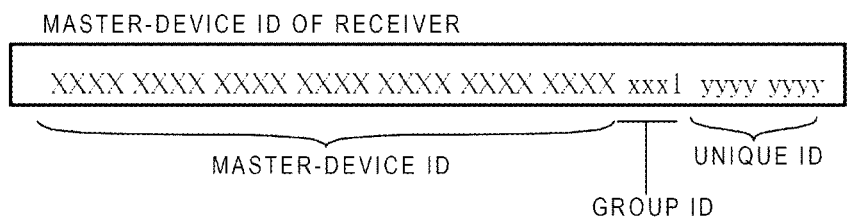
Figure 3C:
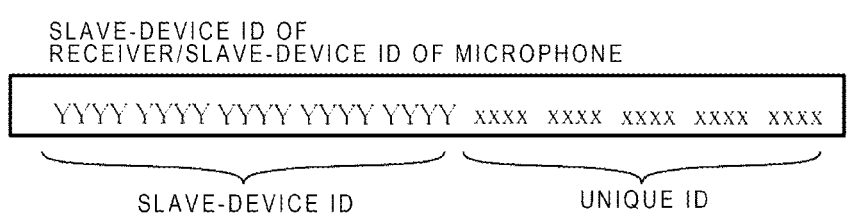

FIGS. 3A to 3C are schematic diagrams showing configuration examples of IDs of the respective devices.

FIG. 3A shows a configuration example of an ID of DECT_AP 30. The ID of DECT_AP 30 includes a master-device ID including information on a manufacture code or a classroom classification, a group ID representing a group, and a unique identification ID of DECT_AP 30. The group ID of the ID of DECT_AP 30 includes, for example, a value of 0 representing DECT_AP 30 at the end.

FIG. 3B shows a configuration example of an ID as a master device of receiver 20. The ID as the master device of receiver 20 includes a master-device ID including information on a manufacture code class or a classroom classification, a group ID representing a group, and a unique identification ID of receiver 20. The group ID of the ID of receiver 20 includes, for example, a value of 1 representing receiver 20 at the end.

FIG. 3C shows a configuration example of an ID as a slave device of receiver 20 or an ID of microphone 10. This ID includes a slave-device ID including information on a manufacture code or a type classification, and a unique identification ID of receiver 20 or microphone 10.

When receiving a radio wave used for DECT communication, control unit 15 of microphone 10 determines that the received radio wave is a radio wave from receiver 20 when the trailer of the group ID has a value of 1, and determines that the received radio wave is a radio wave from DECT_AP 30 when the trailer of the group ID has a value of 0.

As stated above, from the point of view of microphone 10, it is possible to simply distinguish between receiver 20 and DECT_AP 30 by simply checking the trailer of the group ID. Accordingly, for example, when microphone 10 searches for receiver 20, it is possible to rapidly detect receiver 20.

The group is set in advance, and has been already set at the time of shipment from the factory, for example.

Next, an operation example of microphone system 5 will be described.

Figure 4:
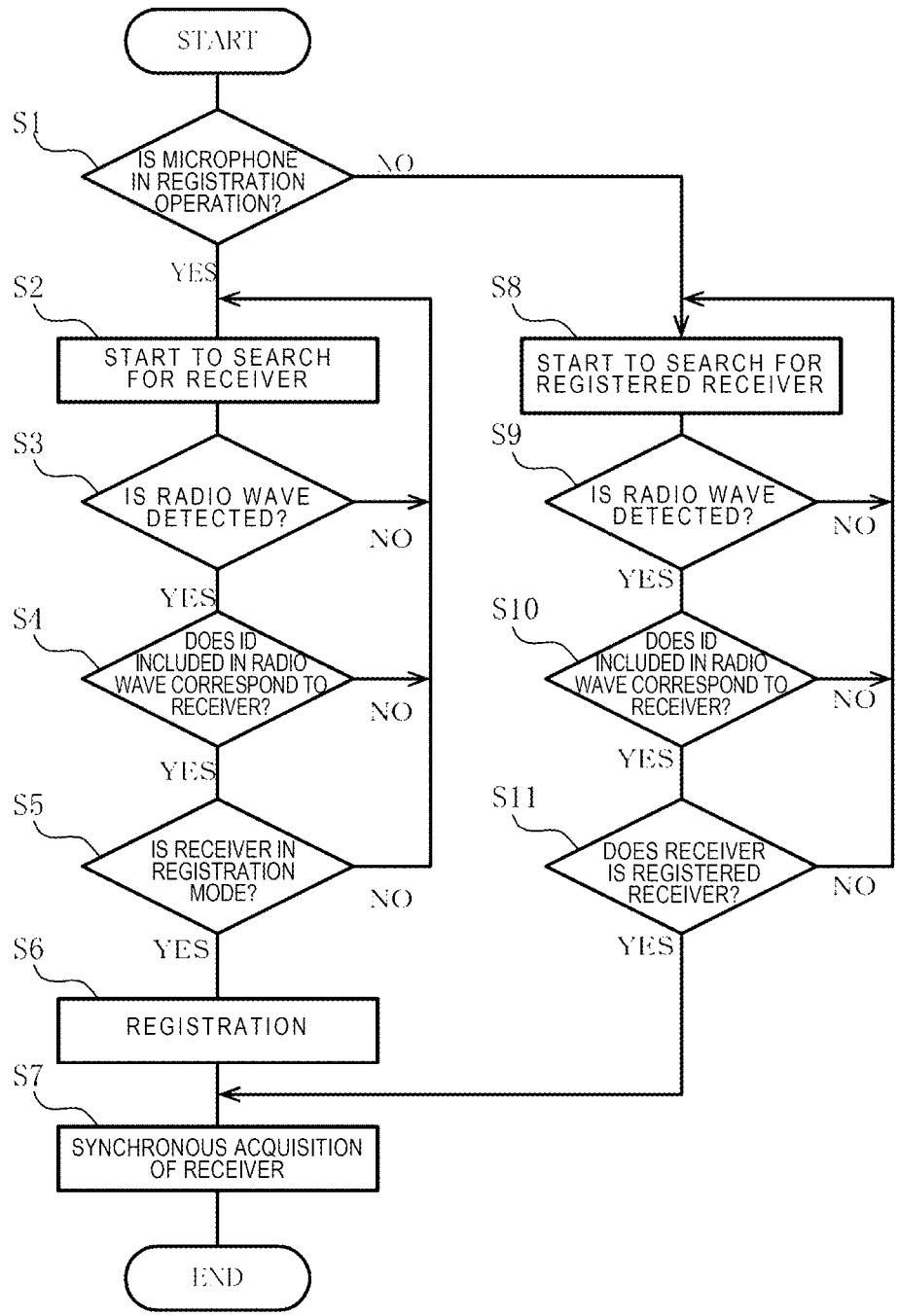
FIG. 4 is a flowchart showing an example of a registration operation process by a microphone according to the exemplary embodiment.

FIG. 4 is a flowchart showing an example of a registration operation process by microphone 10. For example, microphone 10 starts when the microphone is disconnected from a charging cord after the microphone is charged by being connected to the charging cord (charging cradle), and performs this operation. This operation may be performed in another case other than the case where the microphone is disconnected from the charging cord. For example, when the registration button 18a is operated, this operation may be performed.

Control unit 15 determines whether or not the microphone performs the registration operation (S1). In the registration operation, the IDs of receiver 20 and microphone 10 are exchanged with each other, and are respectively stored in storage sections 25a and 15a. For example, control unit 15 determines whether or not the microphone performs the registration operation on the basis of whether or not the ID of receiver 20 is stored (registered) in storage section 15a by referring to storage section 15a. When the microphone performs the registration operation, for example, when the ID of receiver 20 is not registered in storage section 15a, control unit 15 starts to search for receiver 20 (S2).

Wireless control unit 12 determines whether or not a radio wave is detected when searching for receiver 20 (S3).

When the radio wave is detected, control unit 15 determines whether or not an ID included in the detected radio wave is the ID of receiver 20 (S4). When the aforementioned IDs (see FIGS. 3A and 3B) are used, for example, when the trailer of the group ID has a value of 1, control unit 15 determines that the ID included in the radio wave is the ID of receiver 20. For example, when the trailer of the group ID has a value of 0, control unit 15 of microphone 10 determines that the ID included in the radio wave is the ID of DECT_AP 30.

Control unit 15 determines whether or not the detected receiver 20 is in the registration mode (S5). Whether or not the receiver is in the registration mode is determined based on whether or not the registration button of operation unit 28 of receiver 20 has been pressed and a predetermined registration signal has been transmitted from receiver 20.

When the receiver is in the registration mode, the registration operation is performed between microphone 10 and receiver 20 (S6). In this registration operation, the IDs are exchanged with each other, and the IDs are registered. That is, in microphone 10, wireless control unit 12 obtains a master-device ID of receiver 20, and stores the obtained ID in storage section 15a of control unit 15. Meanwhile, in receiver 20, wireless control unit 22 obtains the ID of microphone 10, and stores the obtained ID in storage section 25a of microphone control section 25A.

For example, control unit 15 performs synchronous acquisition so as to perform synchronization on the basis of CCH data transmitted using a CCH transmission slot from registered receiver 20 (S7). Thereafter, microphone 10 ends the present operation.

When the radio wave is not detected in S3, when the ID included in the radio wave is not the ID of receiver 20 in S4, or when the receiver 20 is not in the registration mode in S5, microphone 10 returns to the process of S2 to search for another receiver 20.

Meanwhile, when the microphone is not in the registration mode in S1, for example, when microphone 10 has already registered an ID of any receiver 20, wireless control unit 12 starts to search for the already registered receiver 20 (S8).

Wireless control unit 12 determines whether or not a radio wave is detected in searching for receiver 20 (S9).

When the radio wave is detected, control unit 15 determines whether or not an ID included in the detected radio wave is the ID of receiver 20 (S10).

When the ID included in the detected radio wave is the ID of receiver 20, control unit 15 determines whether or not a receiver whose ID is obtained in S10 is the registered receiver 20 (S11). This determination is performed based on whether or not the aforementioned IDs (see FIG. 3B), for example, the unique identification IDs of receiver 20 match each other.

When the receiver of the obtained ID is the registered receiver 20, control unit 15 performs synchronous acquisition so as to perform synchronization on the basis of CCH data transmitted using a CCH communication slot from the detected registered receiver 20 (S7). Thereafter, microphone 10 maintains a call standby state, that is, a synchronous acquisition state.

According to the registration operation shown in FIG. 4, the operator of microphone 10 can arbitrarily perform an operation for registering microphone 10 in receiver 20. Since the operator checks receiver 20 and resisters microphone 10, it is possible to avoid erroneous registration of the microphone in DECT_AP 30. Since receiver 20 can be checked by the group ID of the ID that is necessarily checked in an initial stage, it is possible to rapidly find receiver 20 as a target, and to rapidly perform synchronization with the receiver as compared to a case where the body of transmitted data (CCH data) is checked.

When microphone 10 is a portable mobile type that can be carried and moved, it is assumed that the microphone can be moved between classrooms. It is assumed that microphone 10 may be replaced with a new one due to a malfunction. For example, when microphone 10 is moved to a different classroom, the registration operation is performed for receiver 20 in another sound amplification system 50. Thus, it is possible to simply use the microphone even in another classroom. In this case, microphone 10 stores only an ID of new receiver 20, and removes the ID of previously stored receiver 20.

For example, DECT_AP 30 is provided to be fixed, and a non-illustrated personal computer (PC) can be connected to DECT_AP 30. A manufacturer operates DECT_AP 30 using, for example, a PC, and a service provider performs a registration operation between receiver 20 and DECT_AP 30 at one time.

Next, a configuration example of a slot used for communication between microphone 10, receiver 20 and DECT_AP 30 will be described.

On Standby

FIG. 5 is a timing chart showing a configuration example of a slot on standby. For example, on-standby refers to a period during which actual data (for example, voice data) is not communicated and control data (for example, CCH data) is communicated. Here, an image includes, for example, a still image or a moving image.

In FIG. 5, one frame (one cycle, for example, 10 msec) includes twelve slots. In the slots of one frame, transmission slots and reception slots are periodically repeated, and appear as consecutive six slots.

For example, in DECT_AP 30 and receiver 20, six first-half slots of one frame correspond to a transmission slot period (transmission frame), and six second-half slots thereof correspond to a reception slot period (reception frame).

For example, in microphone 10, six first-half slots of one frame correspond to a reception slot period (reception frame), and six second-half slots thereof correspond to a transmission slot period (transmission frame).

The reception slot period and the transmission slot period may be inverted. DECT-AP 30 and receiver 20 transmit CCH data using a predetermined slot for each frame.

Although it is assumed that one communication channel is used in the following description of the timing chart, the timing chart is similarly applied to a case where a plurality of channels (frequency bandwidths) is used.

In DECT_AP 30, wireless control unit 32 transmits the CCH data to receiver 20 using a predetermined slot (for example, a first slot) of each cycle. The slot in which the CCH data is communicated refers to a CCH communication slot. A header of the CCH data from DECT_AP 30 includes, for example, the ID of DECT_AP 30, and information on a slot number in which the CCH data is communicated. The CCH data transmitted from DECT_AP 30 is received by each receiver 20. Accordingly, in each receiver 20, wireless control unit 22 can identify that the transmitted CCH data is CCH data from DECT_AP 30 by referring to the header of the CCH data.

In receiver 20, in order to receive the CCH data from DECT_AP 30, wireless control unit 22 sets all of the slots of the frame as the reception slots before the CCH data is received. For example, when power is applied, wireless control unit 22 sets all of the slots as the reception slots, and checks data (including CCH data) from DECT_AP 30.

For example, wireless control unit 22 performs synchronization by a radio wave (radio wave presumed to be transmitted from DECT_AP 30) from a device having an ID that is not registered by referring to the IDs stored in storage sections 25a and 25b within control unit 25. That is, wireless control unit 22 performs frame synchronization with DECT_AP 30 (transmission frame and reception frame).

Wireless control unit 22 sets a slot in which DECT_AP 30 transmits the CCH data as the reception slot. For example, when the CCH data is communicated using an initial slot of each frame, wireless control unit 22 inverts the initial slot (first slot) of each single frame which is originally the transmission slot to the reception slot. Thus, the CCH data from DECT_AP 30 can be received at regular intervals.

In receiver 20, when wireless control unit 22 receives the CCH data from DECT_AP 30 using the first slot of each cycle, control unit 25 performs synchronous acquisition with DECT_AP 30. Wireless control unit 22 transmits the CCH data using a predetermined slot (for example, a third slot) of each cycle. In receiver 20, wireless control unit 22 may check data of all slots of each cycle after receiver 20 is powered on, and select the predetermined slot from unused slots. Alternatively, the predetermined slot may be determined in advance.

The CCH data of receiver 20 is received by, for example, microphones 10 (for example, microphones 1011 and 1012) subordinated to receiver 20. The header of the CCH data of receiver 20 includes, for example, the ID of receiver 20 and information on a slot number by which the CCH data is communicated.

In receiver 20, control unit 25 may set slots that are not used for transmission for one cycle after power is applied to be in a non-activated state.

In microphone 10, for example, wireless control unit 12 receives the CCH data from receiver 20 using the third slot of each cycle, and control unit 15 performs synchronous acquisition with receiver 20. For example, control unit 15 may set slots that are not used for transmission for one cycle after power is applied to be in a non-activated state.

As mentioned above, for example, in order to perform synchronization (matching of timing) for the entire microphone system 5, DECT_AP 30 transmits the CCH data using the first slot of the transmission slot period. For example, the CCH data transmitted from DECT_AP 301 is received by receivers 201 to 20n within the same group (see FIG. 1). Similarly, the CCH data transmitted from DECT_AP 30n is received by receivers 2n1 to 2nn within the same group (see FIG. 1).

DECT_AP 30, receiver 20 and microphone 10 are operated in synchronization with one another. That is, receiver 20 and microphone 10 are synchronized with each other under the control of DECT_AP 30. Thus, it is possible to reduce radio-frequency interference between multiple devices within one classroom, and it is possible to effectively utilize radio resources. By setting different slots as the transmission slots of receivers 20, it is possible to reduce communication interference between receiver 20 and microphones 10 of another classroom, and it is possible to effectively utilize radio resources.

Since the devices communicate with each other in the time division system, even when communication is slightly delayed, a communication error occurs using a limited slot (for example, one slot), and communication errors do not occur in other slots. Thus, it is possible to reduce influence on other slots. That is, it is possible to reduce influence of the occurrence of communication interference.

For example, when different slots are set to receivers 20 provided in the respective classrooms as CCH communication slots used by receivers 20, it is possible to reduce communication interference in the CCH communication slots, and DECT_AP 30 can control many receivers 20.

Next, configuration examples of the CCH data communicated in the systems according to the related art and the present exemplary embodiment will be described.

FIGS. 6A to 6C are schematic diagrams showing configuration examples of CCH data. The CCH data includes various control data, and is transmitted by DECT_AP 30 and receiver 20.

In the related art, in order to perform DECT communication, information of the receiver is obtained by receiving five CCH data items. FIG. 6A shows CCH data used in a cordless telephone system according to the related art. In FIG. 6A, one CCH data item includes one control data item. That is, five control data items are communicated using five slots. The CCH data of FIG. 6A does not include actual data.

If the CCH data of FIG. 6A is used in a cordless telephone using the DECT communication, since a slave device of the cordless telephone is constantly powered on, when synchronous acquisition is completed once, the slave device maintains a synchronized state. That is, since the five CCH data items are received using the five slots, a time is taken to perform the synchronization. However, since the synchronized state is maintained as long as the power is not turned off, the cordless telephone can be immediately used whenever necessary. Thus, even though a time is taken to perform the synchronization, there is not a significant problem, and the amount of data individually transmitted using the five slots is reduced in terms of a reduction in power consumption.

In contrast, microphone 10 is used immediately after the power is supplied in some cases. However, when the CCH data of FIG. 6A is used in microphone system 5, a time is taken to perform the synchronization with receiver 20 after receiving five control data items. Thus, when a user starts to talk with the other party immediately after microphone 10 is powered on, since the synchronization of the microphone with receiver 20 is not completed, there is a possibility that a voice of the user who has started to talk with the other party will not be transmitted.

FIG. 6B shows CCH data used in microphone system 5. The CCH data of FIG. 6B includes five control data items. That is, the five control data items are communicated using one slot. The control data includes identification information (ID), system information, support function information, and multi-frame marker information. The system information includes, for example, information on a frequency, a transmission slot number, and a scan carrier. The support function information includes, for example, information on a transmissible carrier and a service to use. The multi-frame marker information includes, for example, information on superframe synchronization and a multi-frame number.

When the CCH data of FIG. 6B is used, since data items required for synchronization can be received at one time as compared to the case where the CCH data shown in FIG. 6A is used, time taken to perform the synchronization with receiver 20 after microphone 10 is powered on can be shortened, and thus, it is possible to use the microphone immediately after the power is supplied.

In microphone system 5, since microphone 10 receives the CCH data including five control data items using one slot, it is possible to rapidly perform the synchronous acquisition of microphone 10. Accordingly, for example, even when the user starts to talk with the other party immediately after microphone 10 is powered on, it is possible to reduce the possibility that the voice of the user who has started to talk with the other party will not be transmitted. That is, it is possible to realize the same usability as that of the infrared microphone of the related art.

FIG. 6C shows data (CCH combination data) which is used in microphone system 5 and is obtained by combining CCH data with traffic channel (TCH: information channel) data. In the CCH combination data, the TCH data includes, for example, actual data (for example, voice data). The TCH data is an example of information data.

The CCH combination data includes one control data item, and actual data (for example, voice data). For example, when as many receivers 20 have been already connected to microphones 10 in a wireless manner as the number (for example, two) of microphones that can be wirelessly connected to the receiver, receiver 20 does not need to newly perform synchronization with new microphone 10. In this case, the CCH data may be used as the CCH combination data. Thus, it is possible to communicate the actual data together with the control data items, and it is possible to improve communication efficiency.

As stated above, the control data (for example, CCH data) used to perform slot synchronization between microphone 10 and receiver 20 and between receiver 20 and DECT_AP 30 may be transmitted to the respective devices at one time. Thus, it is possible to quickly perform the synchronous acquisition, and it is possible to reduce the interruption of sound at a timing at which the user starts to talk with the other party through microphone 10.

For example, receiver 20 may transmit the CCH combination data in which the CCH data and the TCH data are combined to any one of multiple microphones 10 that are simultaneously connected to receiver 20 in a wireless manner using one slot. Thus, it is possible to effectively utilize radio resources.

Next, a case of using microphone system 5 will be described.

For example, as the case of using microphone system 5, classroom sound amplification, small scale broadcasting, intercom communication, or a combination of at least two of these modes is considered. In the classroom sound amplification, voice data from microphone 10 within the classroom is broadcasted within the classroom from speaker 27. In the small scale broadcasting, a voice produced by the administrator, that is, voice data from microphone 48 is broadcasted from speakers 27 of the respective classrooms. For example, in the intercom communication, the operator within the classroom can be in conversation with the administrator of the administrator room. That is, in the intercom communication, voice data is transmitted and received between receiver 20 within the classroom and main controller 40 of the administrator room.

Classroom Sound Amplification

Figure 7:
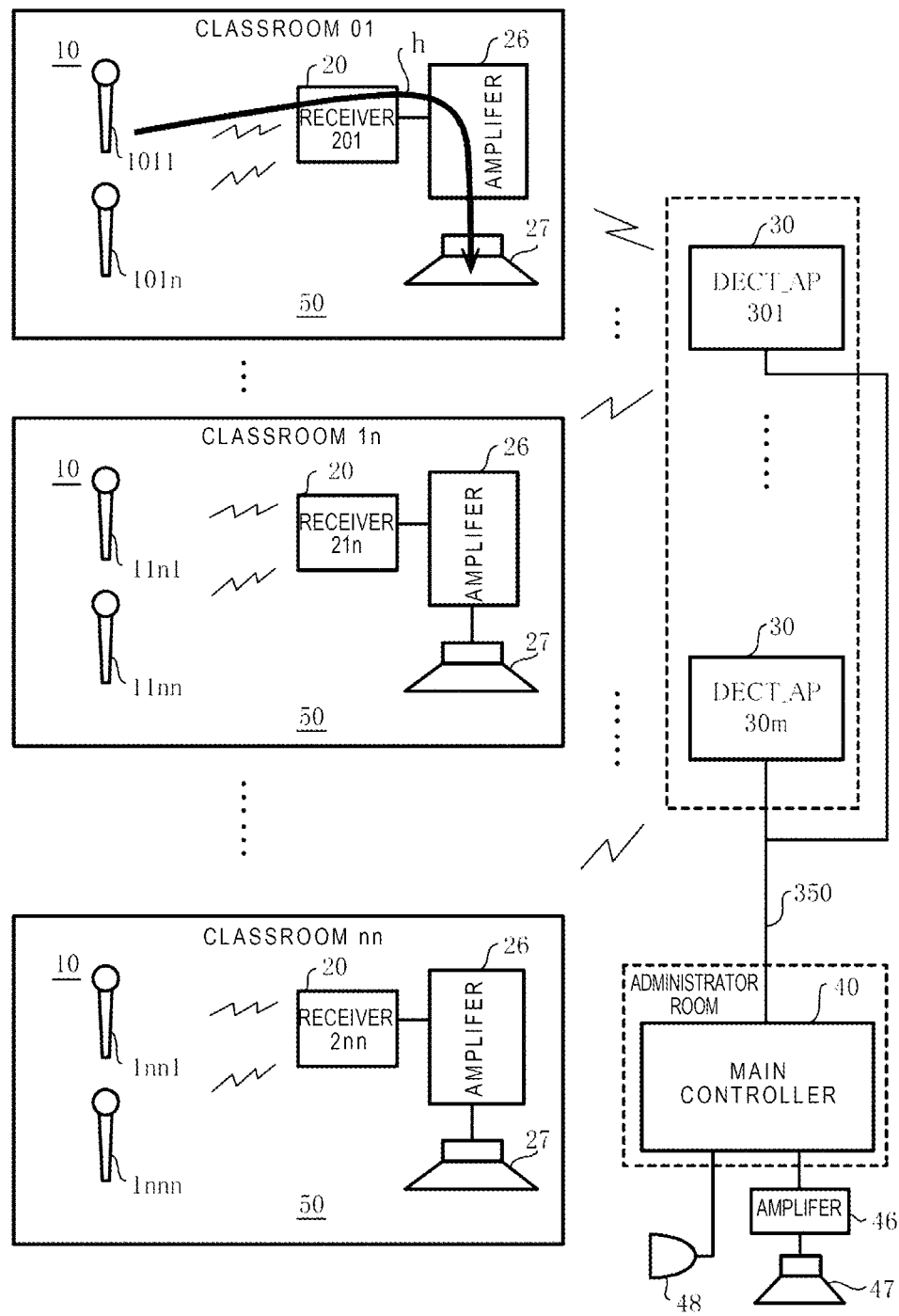
FIG. 7 is a schematic diagram showing an example of the flow of voice data when classroom sound amplification according to the exemplary embodiment is performed.

FIG. 7 is a schematic diagram showing an example of the flow of voice data when microphone system 5 performs the classroom sound amplification. When the classroom sound amplification is performed, microphone 10 searches for receiver 20 in which the microphone is registered, detects receiver 20, and is wirelessly connected to the detected receiver 20. For example, when the operator of microphone 10 operates the operation display unit 18 such that a classroom sound amplification function is turned on, the sound amplification of microphone 10 is started. That is, voice data input to microphone 10 is output as a voice from speaker 27. In the drawing, arrow h indicates the flow of the voice data.

Figure 8:
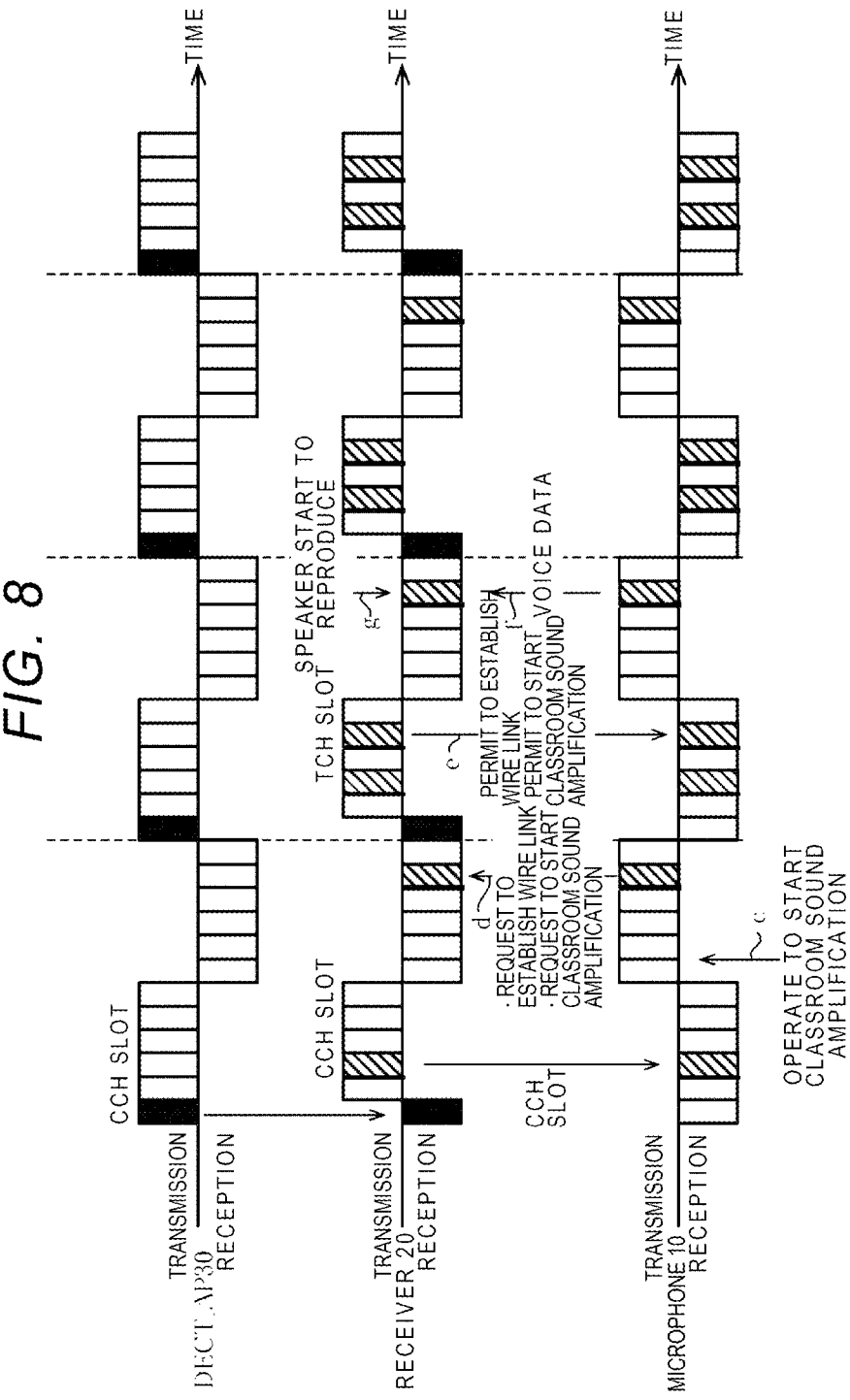
FIG. 8 is a timing chart showing a slot configuration example during classroom sound amplification using one microphone according to the exemplary embodiment.

FIG. 8 is a timing chart showing a slot configuration example when the classroom sound amplification is performed using one microphone 10.

For example, in microphone 10, when the operator operates the operation display unit 18 such that the classroom sound amplification function is turned on (see symbol c), control unit 15 turns on the classroom sound amplification function. In this case, wireless control unit 12 transmits a request to establish a wireless link and a request to start the classroom sound amplification using a predetermined slot (for example, a fifth transmission slot) to receiver 20 (see symbol d). The request to establish the wireless link and the request to start the classroom sound amplification are included in the TCH data.

For example, wireless control unit 12 determines the predetermined slot by searching for an idle slot according to a predetermined algorithm or based on information on slots included in the CCH data from receiver 20 (the same hereinafter).

In receiver 20, wireless control unit 22 receives the request to establish the wireless link and the request to start the classroom sound amplification from microphone 10 using a predetermined slot (for example, a fifth reception slot). Wireless control unit 22 transmits a permission to establish the wireless link and a permission to start the classroom sound amplification to microphone 10 using the next fifth transmission slot (see symbol e), and the permission to establish the wireless link and the permission to start the classroom sound amplification are included in the TCH data.

For example, wireless control unit 22 determines the predetermined slot by searching for an idle slot according to a predetermined algorithm (the same hereinafter).

In microphone 10, wireless control unit 12 receives the permission to establish the wireless link and the permission to start the classroom sound amplification from receiver 20 using a predetermined slot (for example, fifth reception slot). Wireless control unit 12 transmits voice data absorbed by microphone 10 to receiver 20 using the next fifth transmission slot (see symbol f).

In receiver 20, wireless control unit 22 receives voice data from microphone 10 using a predetermined slot (for example, a fifth reception slot). Voice processing unit 23 reproduces the voice data, and voice output unit 24 outputs a voice amplified through speaker 27 (see symbol g).

In FIG. 8, the voice data is transmitted from microphone 10 to receiver 20 using the fifth transmission slot. For example, a timing of this slot is determined by a timing at which microphone 10 transmits the request to establish the wireless link to receiver 20. For example, in microphone 10, when an idle slot is detected, the voice data is repeatedly transmitted using the detected idle slot.

According to the classroom sound amplification shown in FIG. 8, in the sound amplification system 50, it is possible to amplify the voice absorbed by microphone 10. In this case, it is possible to improve data quality by expediting the synchronous acquisition of microphone 10 by receiver 20 while reducing power consumption with the same usability as that of the infrared microphone of the related art.

Figure 9:
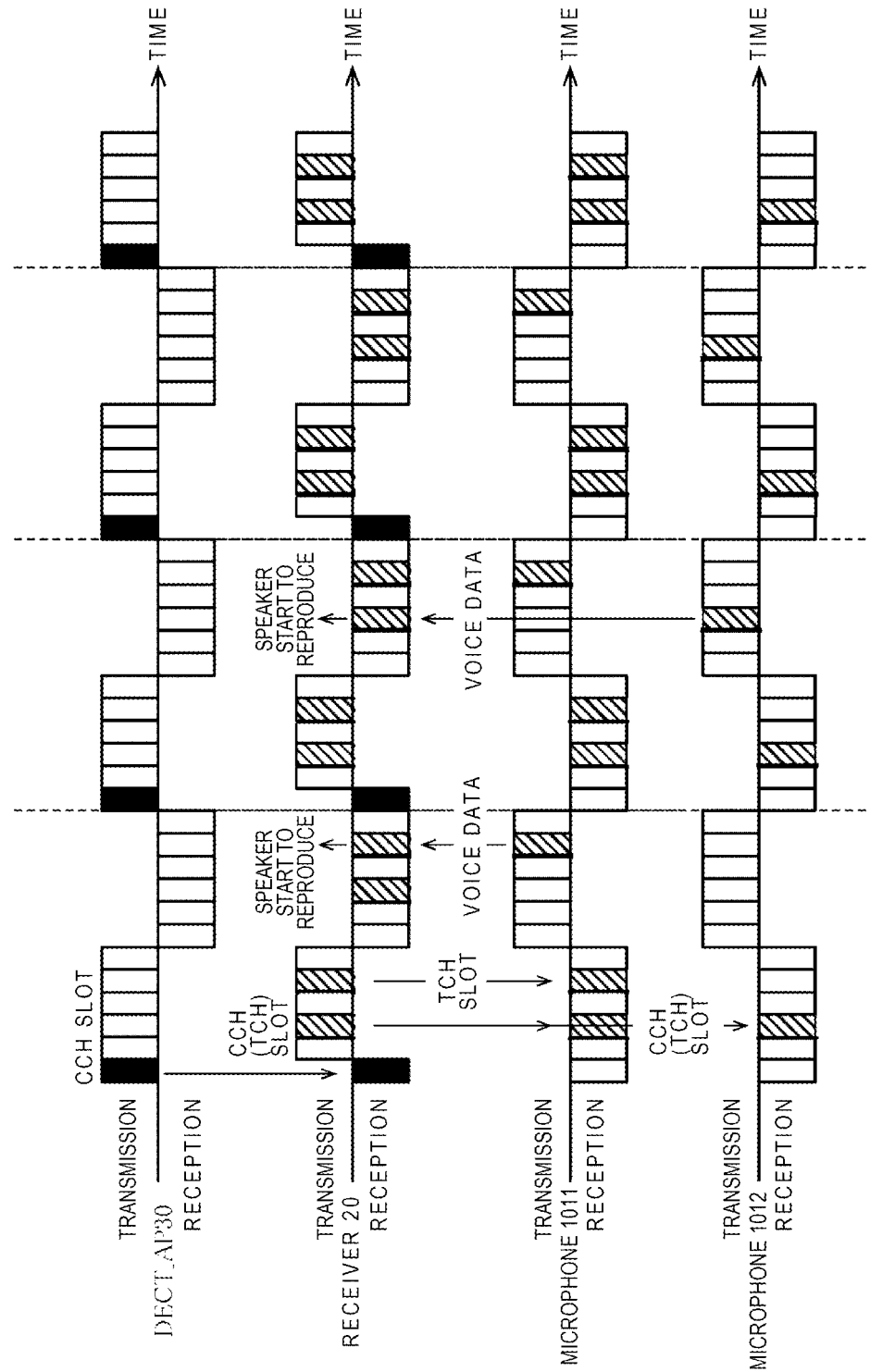
FIG. 9 is a timing chart showing a slot configuration example during classroom sound amplification using two microphones according to the exemplary embodiment.

FIG. 9 is a timing chart showing a slot configuration example when the classroom sound amplification is performed using two microphones 10. In FIG. 9, a difference from that of FIG. 8 will be primarily described. In FIG. 9, two microphones 10 have already been powered on, and two microphones 10 and receiver 20 have synchronized with each other.

FIG. 9 shows a case where microphones 1011 and 1012 as two microphones 10 are wirelessly connected to receiver 10. When two microphones 10 are wirelessly connected, voice data from microphone 1011 and voice data from microphone 1012 are communicated using different slots.

In receiver 20, wireless control unit 22 transmits CCH combination data in which CCH data and TCH data for microphone 1012 are combined using a predetermined slot (for example, a third transmission slot). Since the CCH data is included in this data, both of microphone 1011 and microphone 1012 receive the data, and check the received data. Receiver 20 transmits TCH data for microphone 1011 using a predetermined slot (for example, a fifth transmission slot). The destination of the TCH data (included in a header) is microphone 1011. Accordingly, this TCH data is discarded in microphone 1012.

In microphone 1011, wireless control unit 12 receives the CCH combination data using a predetermined slot (for example, a third reception slot). Wireless control unit 12 receives the TCH data using a predetermined slot (for example, a fifth reception slot).

In microphone 1012, wireless control unit 12 receives the CCH combination data using a predetermined slot (for example, a third reception slot).

Here, the destination of the header of the CCH combination data is, for example, two microphones 1011 and 1012. The portion of the CCH data includes control data, and is checked by both of microphones 1011 and 1012. The portion of the CCH data includes, as control data, for example, information indicating that the TCH data is data for microphone 1012 and identification information of a slot (here, a third transmission slot) in which actual data for microphone 1012 is transmitted. The portion of the TCH data includes actual data (for example, voice data) for microphone 1012.

In microphone 1012, wireless control unit 12 checks the CCH data of the CCH combination data received using the third reception slot. Wireless control unit 12 checks the portion of the TCH data, checks that the TCH data is for microphone 1012, and checks the actual data for microphone 1012.

Meanwhile, in microphone 1011, wireless control unit 12 checks the CCH data of the CCH combination data received using the third reception slot. Since wireless control unit 12 checks the header of the TCH data to check that the destination of the TCH data is not the microphone itself, the wireless control unit does not check the actual data for microphone 1012.

According to the classroom sound amplification shown in FIG. 9, in sound amplification system 50, it is possible to amplify the voice absorbed by microphone 10. In this case, it is possible to expedite the synchronous acquisition of microphone 10 with receiver 20 while reducing power consumption with the same usability as that of the infrared microphone of the related art. For example, when the full number of microphones 10 is connected to receiver 20, since it is possible to halve the number of slots required for communication using the CCH combination data as compared to the case where data items are separately transmitted, it is possible to reduce communication resources, and it is possible to improve communication efficiency.

Although it has been described in FIG. 9 that the CCH combination data is used, the CCH data and the TCH data included the CCH combination data may be communicated using separate slots.

Small Scale Broadcasting

Figure 10:
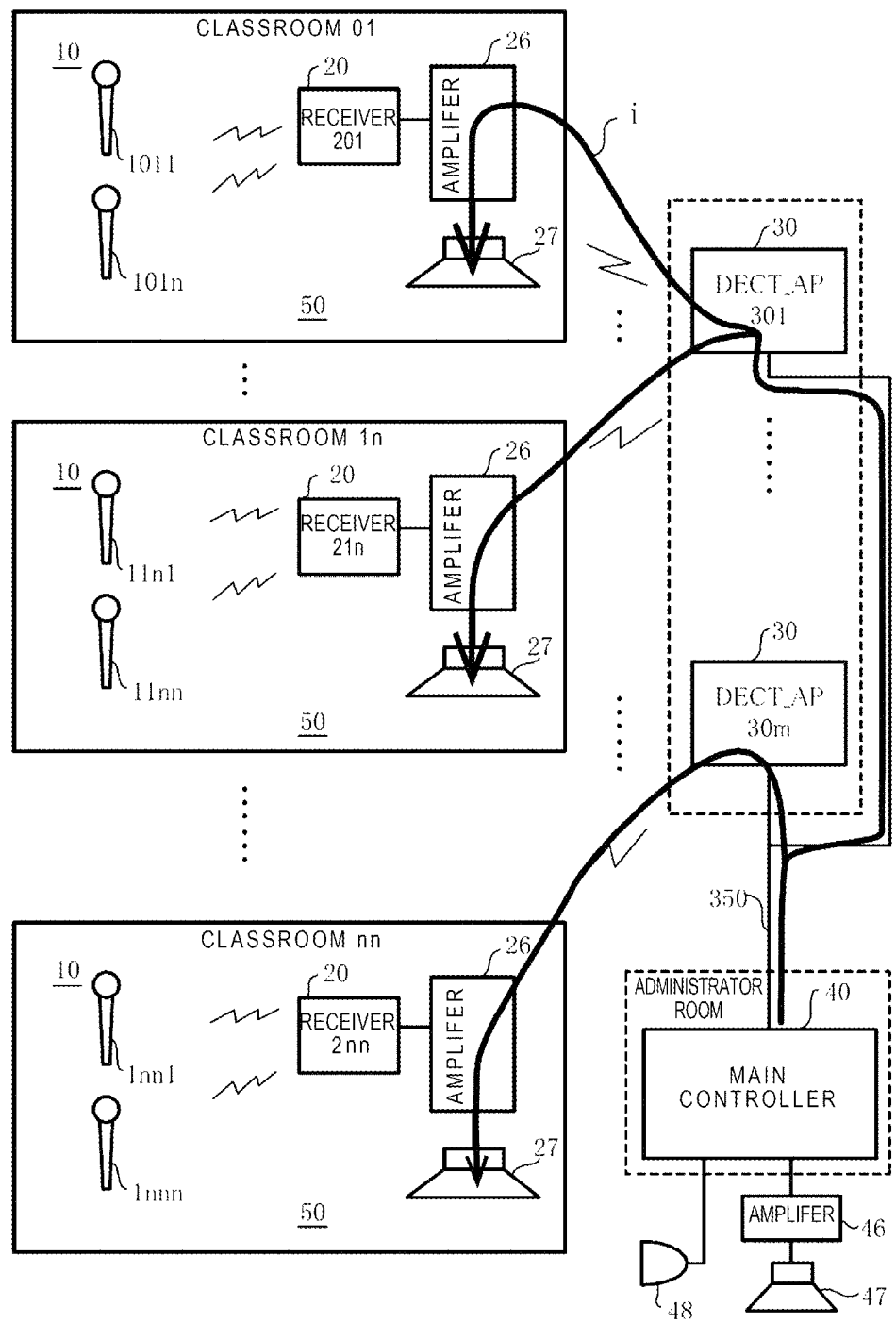
FIG. 10 is a schematic diagram showing an example of the flow of voice data when small scale broadcasting according to the exemplary embodiment is performed.

FIG. 10 is a schematic diagram showing an example of the flow of voice data when microphone system 5 performs the small scale broadcasting. In FIG. 10, arrow i represents the flow of the voice data. For example, in the small scale broadcasting, the voice data is absorbed using microphone 48 of main controller 40, and is communicated from main controller 40 through DECT_APs 30. The voice data is output from speakers 27 of the respective classrooms.

Figure 11:
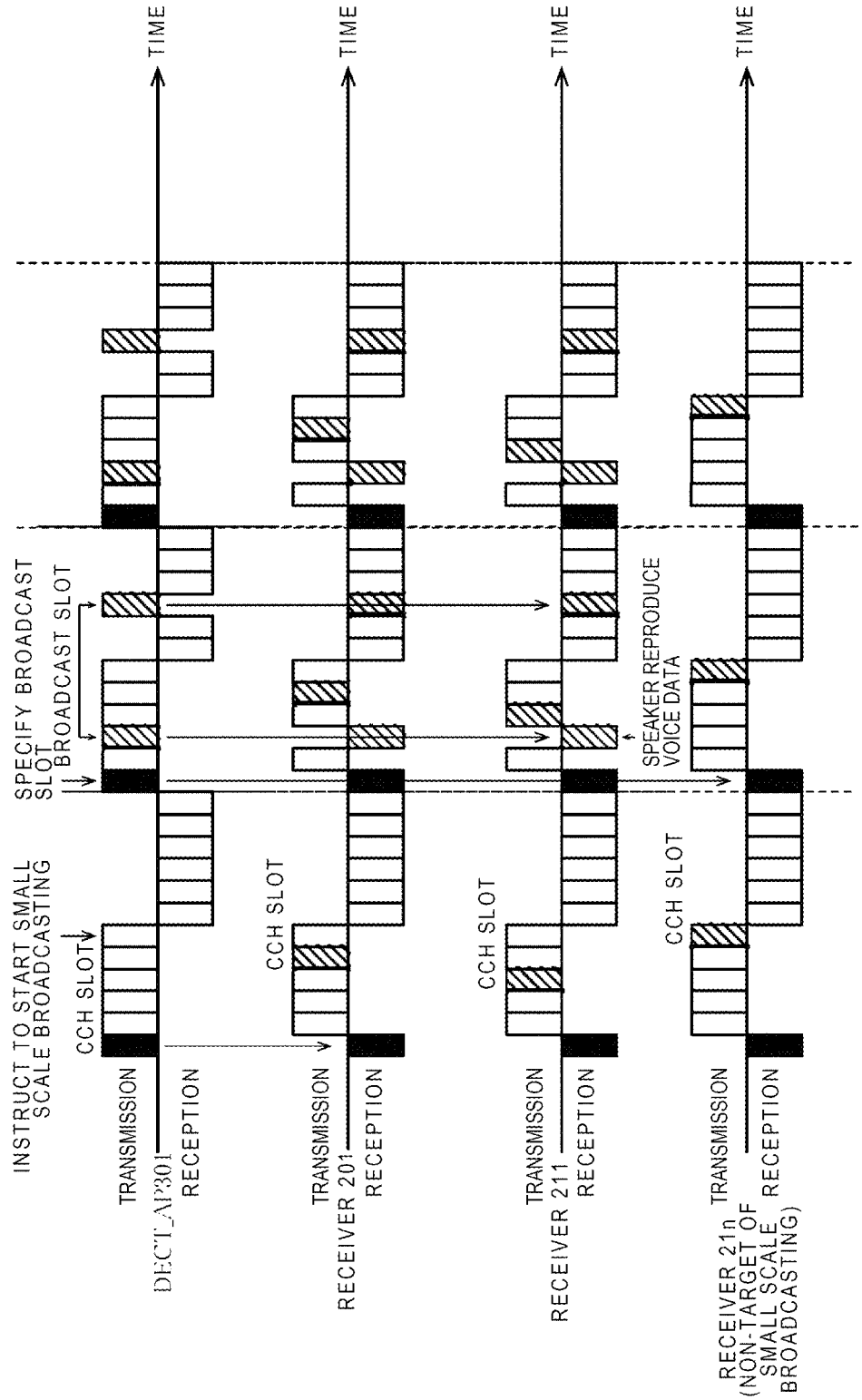
FIG. 11 is a timing chart showing a slot configuration example during the small scale broadcasting according to the exemplary embodiment.

FIG. 11 is a timing chart showing a slot configuration example when the small scale broadcasting is performed.

In DECT_AP 301, wireless control unit 32 receives an instruction to start the small scale broadcasting from main controller 40 using a predetermined reception slot.

In receivers 201, . . . , and 21n, wireless control units 22 respectively transmit CCH data to subordinate microphones 1011 to 101n, . . . , and 11n1 to 11nn using different slots. Thus, one DECT_AP 30 can control multiple receivers 201.

When the instruction to start the small scale broadcasting is given from main controller 40, in DECT_AP 301, wireless control unit 32 instructs receivers 201 and 211 which are targets of the small scale broadcasting to specify slots (broadcast slots) for transmitting broadcast data using a CCH communication slot. The header of the CCH data includes, for example, an ID of receiver 20 which is a target of the small scale broadcasting, and a slot number used for communication of the small scale broadcasting. The broadcast data includes, for example, actual data (for example, voice data) broadcasted in the small scale broadcasting.

In FIG. 11, for example, a third transmission slot is specified as the broadcast slot. In FIG. 11, it will be described that receiver 21n is not specified as a target of the small scale broadcasting.

In receivers 201 and 211 which are targets of the small scale broadcasting, wireless control units 22 respectively invert third transmission slots to reception slots, and receive voice data transmitted from DECT_AP 301. Voice output units 24 of receivers 201 and 211 output the reproduced voice data as a voice.

Meanwhile, in receiver 21*n* which is not a target of the small scale broadcasting, wireless control unit 22 does not receive the voice data from DECT_AP 301 using a third slot as a transmission slot.

In DECT_AP 301, wireless control unit 32 inverts a third reception slot to a transmission slot, and transmits broadcast data, similarly to the third transmission slot. In this case, in receivers 201 and 211 which are targets of the small scale broadcasting, wireless control units 22 receive the broadcast data using third reception slots without inverting the reception slots corresponding to the third reception slot of DECT_AP 310.

According to the small scale broadcasting shown in FIG. 11, since the number of transmission slots of the broadcast data is increased to double, the same broadcast data is transmitted twice, and thus, it is possible to improve error tolerance. Instead of improving the error tolerance, a communication speed may be increased to double by transmitting the next broadcast data. The communication speed may be increased to, for example, three times or four times by further increasing the number of transmission slots of the broadcast data.

In FIG. 11, for example, since it is assumed that the small scale broadcasting is the in-school broadcasting, it is less likely to receive data from receiver 201. Thus, it is considered that even though the number of reception times (the number of slots) of DECT_AP 301 is reduced, this has little effect.

Figure 12:
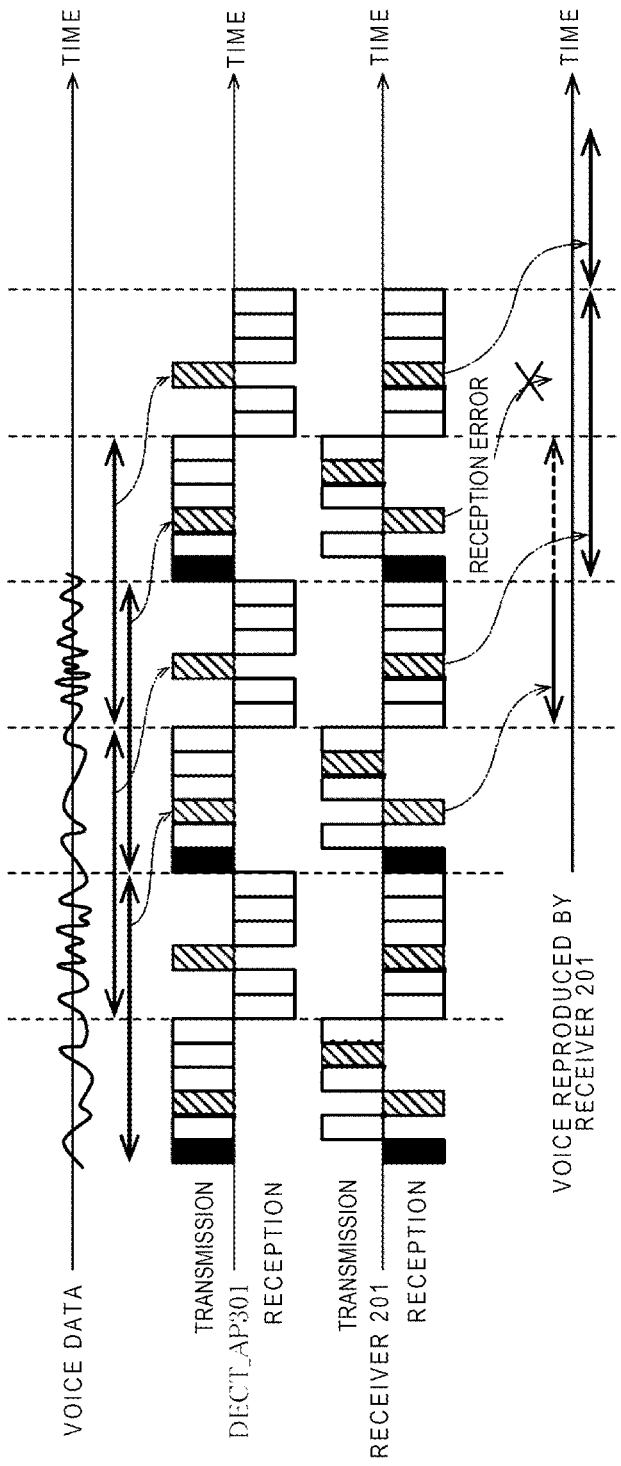
FIG. 12 is a timing chart showing an example of adding a broadcast slot during the small scale broadcasting according to the exemplary embodiment.

FIG. 12 is a timing chart showing an example of adding the broadcast slot during the small scale broadcasting shown in FIG. 11.

In FIG. 12, the same voice data is transmitted using two slots (for example, a third transmission slot and a transmission slot inverted from a third reception slot). Thus, it is possible to improve the error tolerance.

When the same voice data is transmitted using two slots, it is considered whether to completely match frames in which the voice data is transmitted or whether to shift the first halves of frames in which the voice data is transmitted and to overlap the second halves thereof. In FIG. 12, the latter is selected, and the half of voice data in one frame overlaps with the half of voice data of an adjacent frame. It is possible to reduce a communication delay by overlapping a part of data.

As mentioned above, when main controller 40 performs broadcast communication with multiple receivers 20 through DECT_AP 30, receiver 20 may change a part of transmission slots to reception slots for broadcast communication, and DECT_AP 30 may change a part of reception slots to transmission slots for broadcast communication. Thus, when the broadcast communication (for example, small scale broadcasting) is performed, it is possible to increase the amount of data communicated, and it is possible to improve communication efficiency.

For example, since the amount of data that can be transmitted from DECT_AP 30 to receivers 20 is increased, it is possible to improve error tolerance by transmitting the same data multiple times (for example, twice). It is possible to improve a communication speed by transmitting different data items multiple times (for example, twice).

Figure 13:
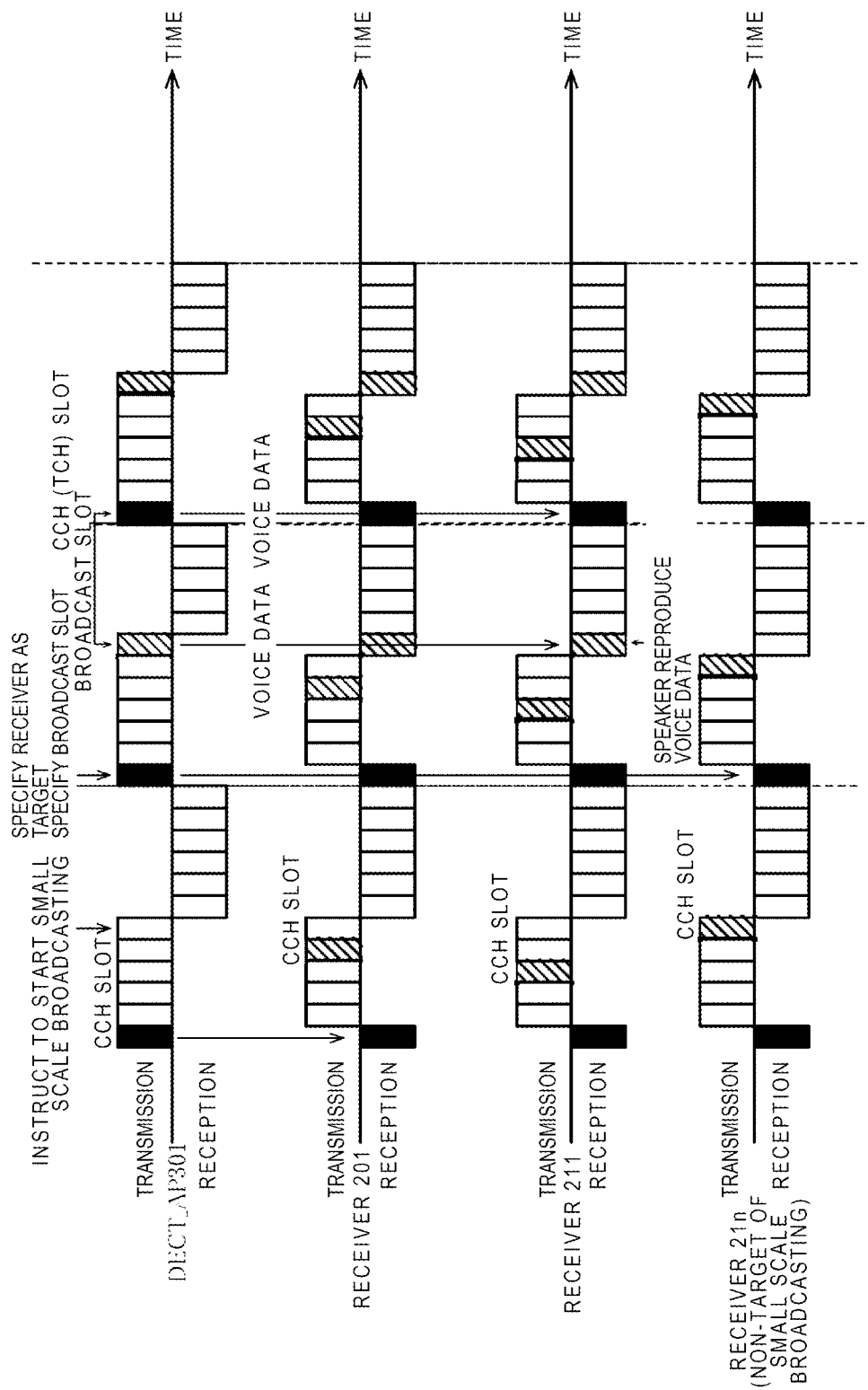
FIG. 13 is a timing chart showing another slot configuration example during the small scale broadcasting according to the exemplary embodiment.

FIG. 13 is a timing chart showing another slot configuration example in the small scale broadcasting. In FIG. 13, a difference from FIG. 11 will be primarily described.

In DECT_AP 30, wireless control unit 32 inverts a predetermined slot (for example, a first reception slot) to a transmission slot in a reception frame, and transmits broadcast data using two transmission slots including the inverted transmission slot and a first transmission slot. Thus, the data amount of actual transmitted data is increased to double.

In DECT_AP 30, wireless control unit 32 transmits CCH combination data using the first transmission slot. This CCH combination data includes CCH data and TCH data, and the TCH data includes actual data (for example, voice data). Thus, it is possible to improve utilization efficiency of the slots, and it is possible to effectively utilize radio resources.

According to the small scale broadcasting shown in FIG. 13, since the number of transmission slots of the broadcast data is increased to double, it is possible to improve error tolerance or it is possible to improve a communication speed as in the case of FIG. 11. It is possible to more effectively improve communication efficiency using the CCH combination data in the small scale broadcasting.

Intercom Communication

Figure 14:
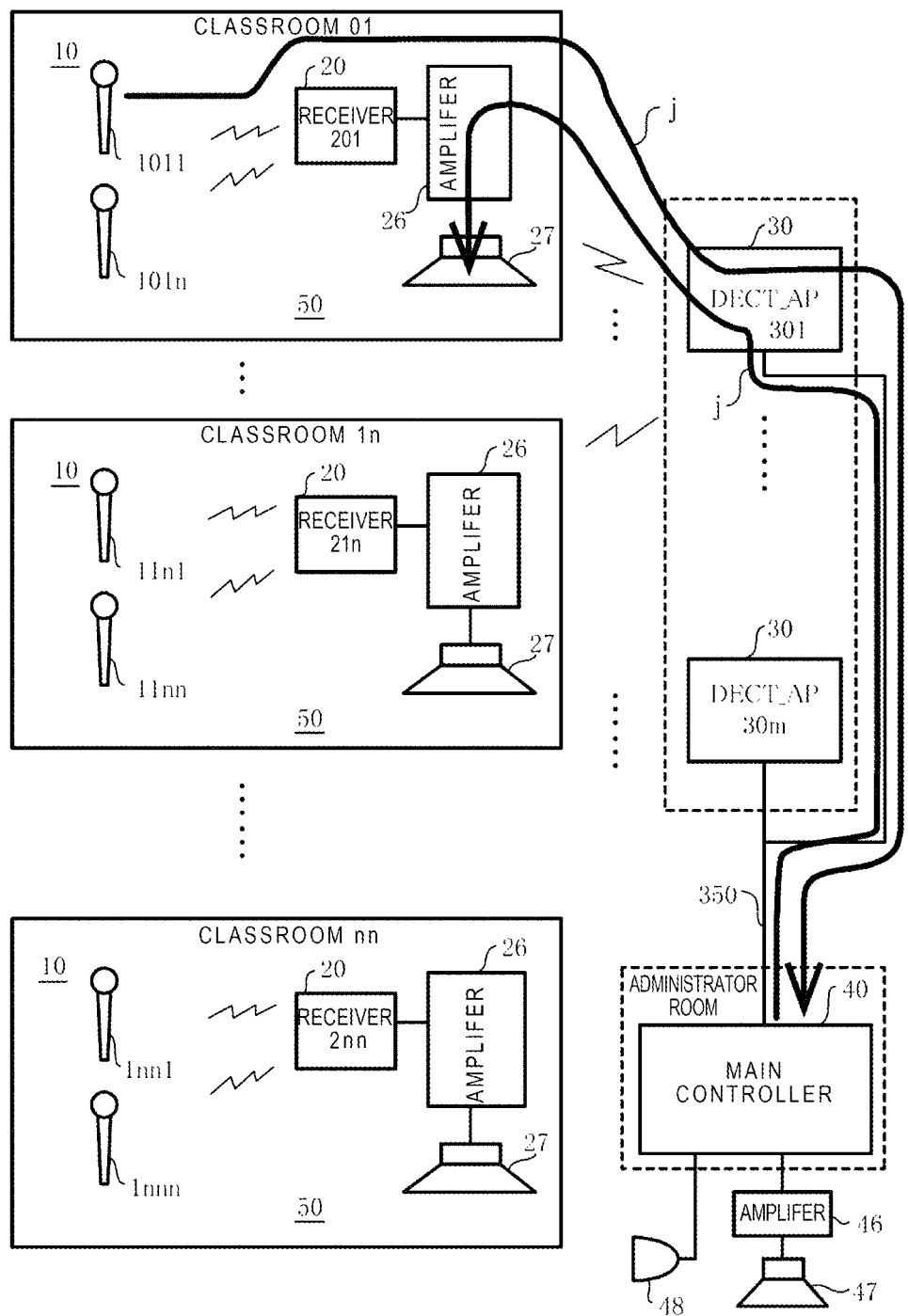
FIG. 14 is a schematic diagram showing an example of the flow of voice data when intercom communication according to the exemplary embodiment is performed.

FIG. 14 is a schematic diagram showing an example of the flow of voice data when microphone system 5 performs the intercom communication. In FIG. 14, arrow j represents the flow of the voice data. In the intercom communication, the voice data absorbed by microphone 48 of main controller 40 is output as a voice from speaker 27 of receiver 20 via DECT_AP 30. In the intercom communication, the voice data absorbed by microphone 10 is output as a voice from speaker 47 of main controller 40 through receiver 20 and DECT_AP 30. As described above, in the intercom communication, as compared to the small scale broadcasting, uplink data communication in which the voice data is transmitted from microphone 10 to main controller 40 is performed.

Figure 15:
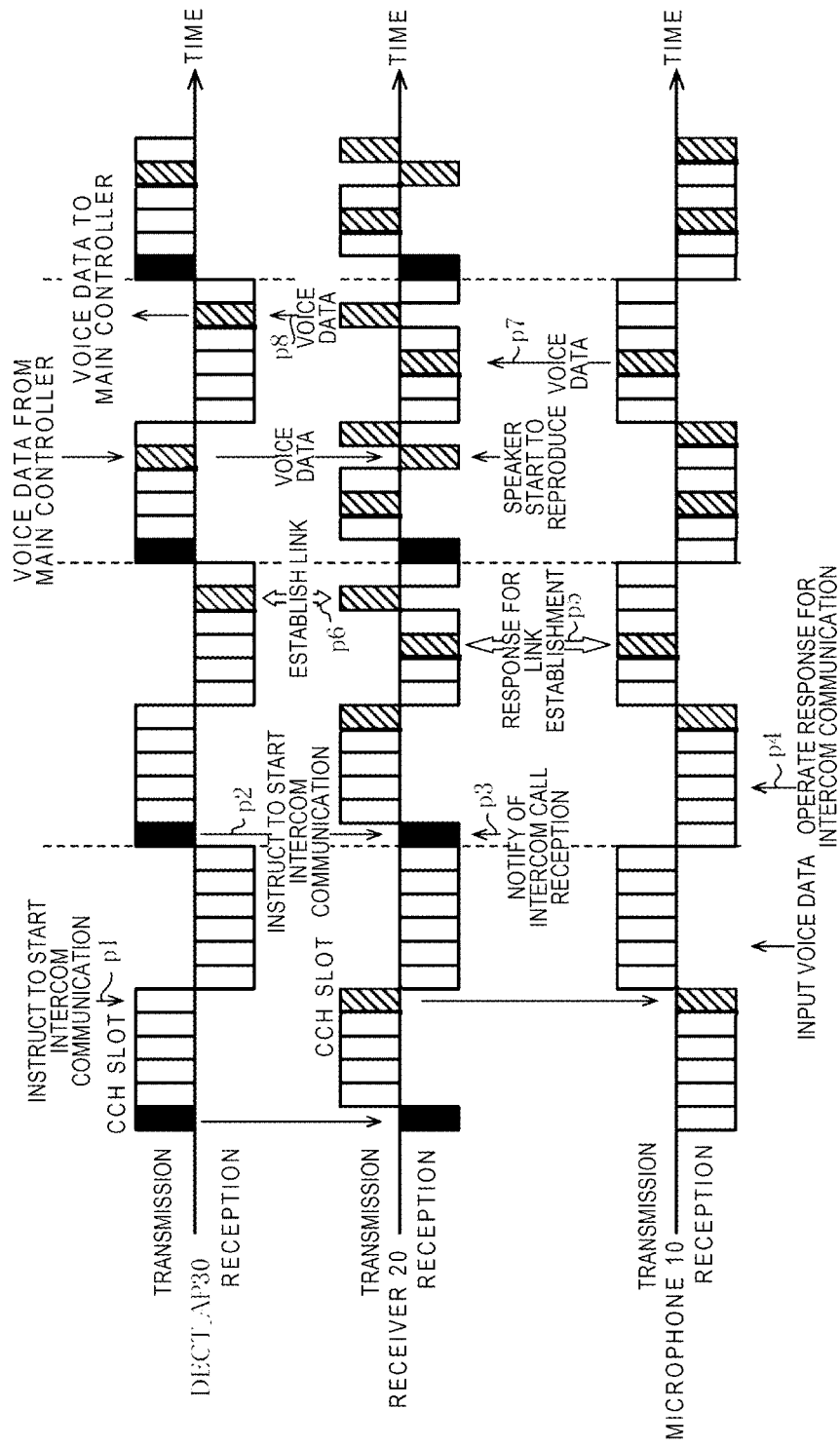
FIG. 15 is a timing chart showing a slot configuration example during the intercom communication according to the exemplary embodiment.

FIG. 15 is a timing chart showing a slot configuration example during the intercom communication.

In DECT_AP 30, wireless control unit 32 receives an instruction to start the intercom communication from main controller 40 using a predetermined reception slot (see symbol p1).

When the instruction to start the intercom communication is received, wireless control unit 32 instructs, for example, receiver 20 to start the intercom communication using a CCH communication slot (for example, a sixth transmission slot) (see symbol p2).

For example, in receiver 20, when wireless control unit 22 receives the instruction to start the intercom communication, voice output unit 24 informs of intercom communication call reception by outputting a voice from speaker 27 (see symbol p3).

For example, in microphone 10, operation display unit 18 receives a response operation for the intercom communication from the operator who has confirmed the notification of the intercom communication call reception (see symbol p4). In this case, wireless control unit 12 establishes a wireless link with receiver 20 using a predetermined slot (for example, a third transmission slot) (see symbol p5).

In receiver 20, wireless control unit 22 establishes a wireless link with DECT_AP 30 using a predetermined slot (for example, a fifth transmission slot) after the intercom communication call reception is notified (see symbol p6).

Accordingly, when the operator speaks through microphone 10, voice data is transmitted to main controller 40 via the wireless links established between microphone 10 and receiver 20 and between receiver 20 and DECT_AP 30.

For example, in microphone 10, wireless control unit 12 establishes a wireless link with receiver 20 using a third transmission slot, and transmits the voice data to receiver 20 (see symbol p7).

For example, in receiver 20, wireless control unit 22 inverts a fifth reception slot to a transmission slot, establishes a wireless link with DECT_AP 30, and transmits the voice data to DECT_AP 30 (see symbol p8). This voice data is transmitted from DECT_AP 30 to main controller 40, and is output as a voice from speaker 47.

When the administrator speaks through microphone 48, voice data is transmitted to receiver 20 via the wireless links established between receiver 20 and DECT_AP 30 and between microphone 10 and receiver 20.

For example, in DECT_AP 30, wireless control unit 32 receives the voice data from main controller 40 using a fifth transmission slot, and transmits the received voice data to receiver 20.

For example, in receiver 20, wireless control unit 22 inverts a fifth transmission slot to a reception slot, and receives the voice data from DECT_AP 30. Voice output unit 24 outputs the received voice from speaker 27.

According to the intercom communication shown in FIG. 15, DECT_AP 30 and receiver 20 can mutually transmit and receive actual data using the same slot for each frame by appropriately inverting the slots of receiver 20. DECT_AP 30 and receiver 20 can mutually transmit and receive actual data using the same slot for each frame. Accordingly, it is possible to realize the intercom communication by reducing power consumption of the microphone and improving data quality.

Small Scale Broadcasting during Classroom Sound Amplification

Figure 16:
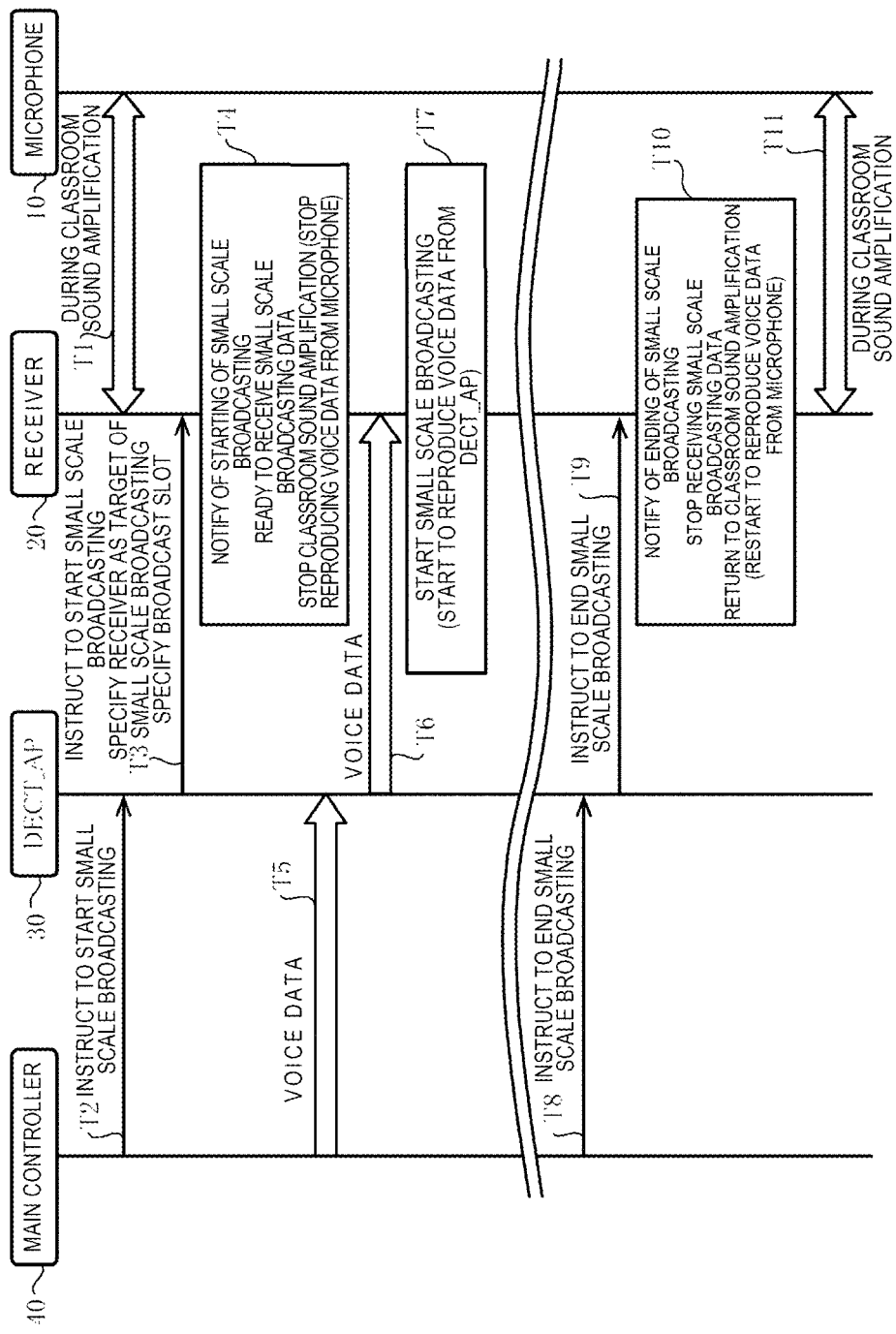
FIG. 16 is a sequence diagram showing an example of the flow of the small scale broadcasting during the classroom sound amplification according to the exemplary embodiment.

FIG. 16 is a sequence diagram showing an example of the flow of the small scale broadcasting during the classroom sound amplification.

During the classroom sound amplification between microphone 10 and receiver 20 (T1), main controller 40 instructs DECT_AP 30 to start the small scale broadcasting (T2). In this case, DECT_AP 30 instructs receiver 20 to start the small scale broadcasting, specifies receiver 20 which is a target of the small scale broadcasting, and specifies a broadcast slot (T3).

When the instruction to start the small scale broadcasting is received, receiver 20 which is a target of the small scale broadcasting is specified and the broadcast slot is specified, and receiver 20 informs of the starting of the small scale broadcasting through speaker 27, and is ready to receive data of the small scale broadcasting (T4). Specifically, control unit 25 of receiver 20 stops the classroom sound amplification, and stops reproducing the voice data from microphone 10 by voice processing unit 23.

Control unit 25 of receiver 20 changes the operational mode from the classroom sound amplification to the small scale broadcasting. When receiving the voice data from main controller 40 through DECT_AP 30 (T5 and T6), receiver 20 starts to output voice data of the small scale broadcasting (T7).

When receiving an instruction to end the small scale broadcasting from main controller 40 through DECT_AP 30 (T8 and T9), receiver 20 informs of the ending of the small scale broadcasting from speaker 27, and stops receiving data related to the small scale broadcasting (T10).

Control unit 25 of receiver 20 changes the operational mode from the small scale broadcasting to the classroom sound amplification. When receiving the instruction to end the small scale broadcasting, receiver 20 returns the operational mode to the classroom sound amplification. That is, the reproducing of the voice data from microphone 10 is restarted. Accordingly, the classroom sound amplification is performed again using microphone 10 and receiver 20 (T11).

Change from Classroom Sound Amplification to Small Scale Broadcasting

Figure 17:
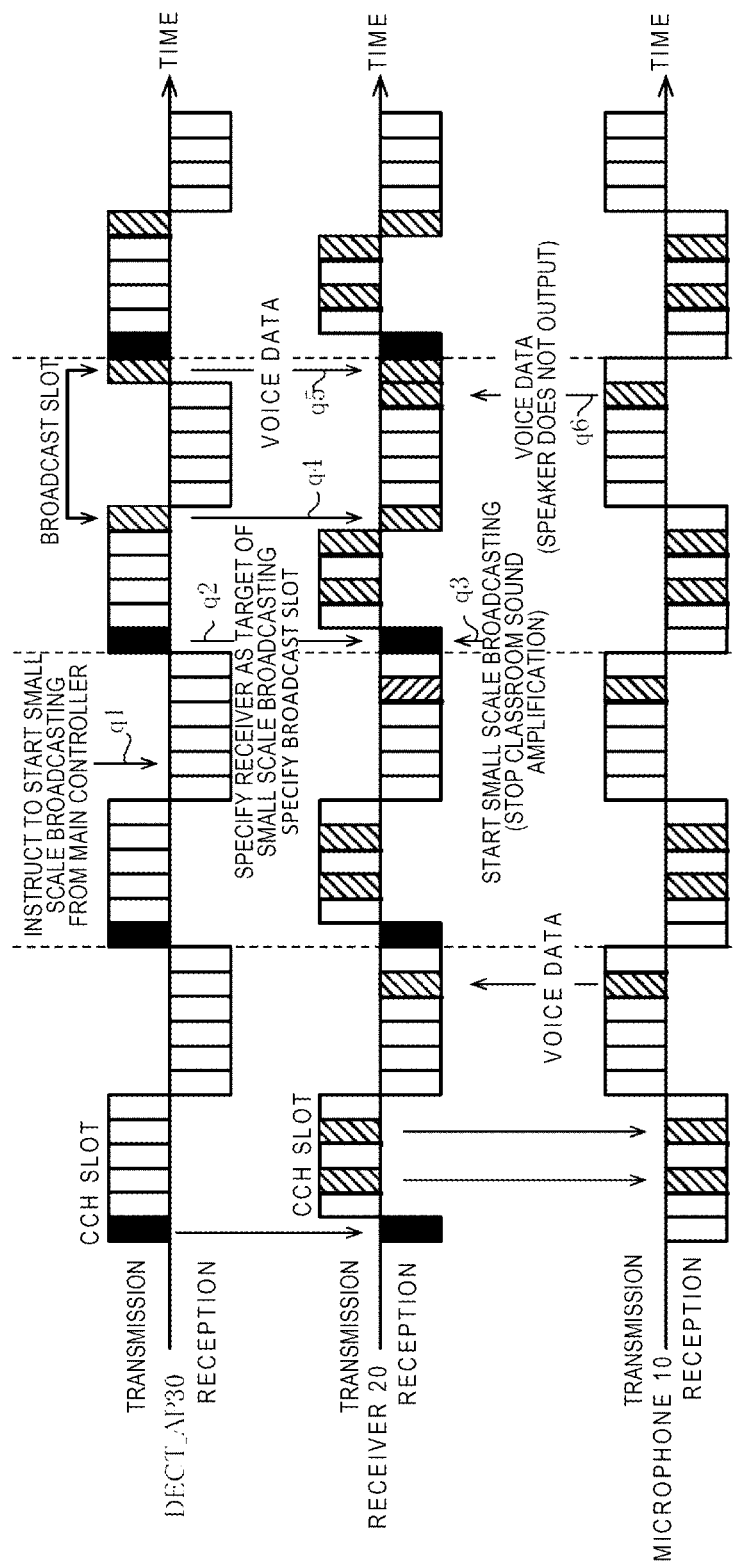
FIG. 17 is a timing chart showing a slot configuration example when an operational mode is changed to small scale broadcasting from the classroom sound amplification according to the exemplary embodiment.

FIG. 17 is a timing chart showing a slot configuration example when the operational mode is changed from the classroom sound amplification to small scale broadcasting. In the classroom sound amplification shown in FIG. 17, a fifth transmission slot of microphone 10 and a fifth reception slot of receiver 20 are used.

During the classroom sound amplification, when receiving an instruction to start the small scale broadcasting from main controller 40 through LAN cable 350 (see symbol q1), DECT_AP 30 instructs receivers 20 which receivers 20 are to be targets of the small scale broadcasting and which broadcast slots are to be used using a first CCH communication slot (see symbol q2).

When receiver 20 inverts a first transmission slot to a reception slot and is instructed which broadcast slots are to be used and which receivers 20 are to be targets of the small scale broadcasting using the inverted slot, the receiver changes the operational mode to start the small scale broadcasting, and stops the classroom sound amplification (see symbol q3).

When the small scale broadcasting is started, DECT_AP 30 transmits voice data to receiver 20 using, for example, a sixth transmission slot and a transmission slot inverted from a sixth reception slot as broadcast slots. That is, DECT_AP 30 transmits the voice data to receiver 20 using two broadcast slots (see symbols q4 and q5).

For example, receiver 20 receives the voice data of the broadcast communication using a reception slot inverted from a sixth transmission slot and a sixth reception slot as broadcast slots. Receiver 20 outputs the received voice data from speaker 27.

Receiver 20 receives voice data from microphone 10 using the fifth reception slot that has been used in the classroom sound amplification, but does not output the voice data from speaker 27 (see symbol q6).

Return to Classroom Sound Amplification from Small Scale Broadcasting

Figure 18:
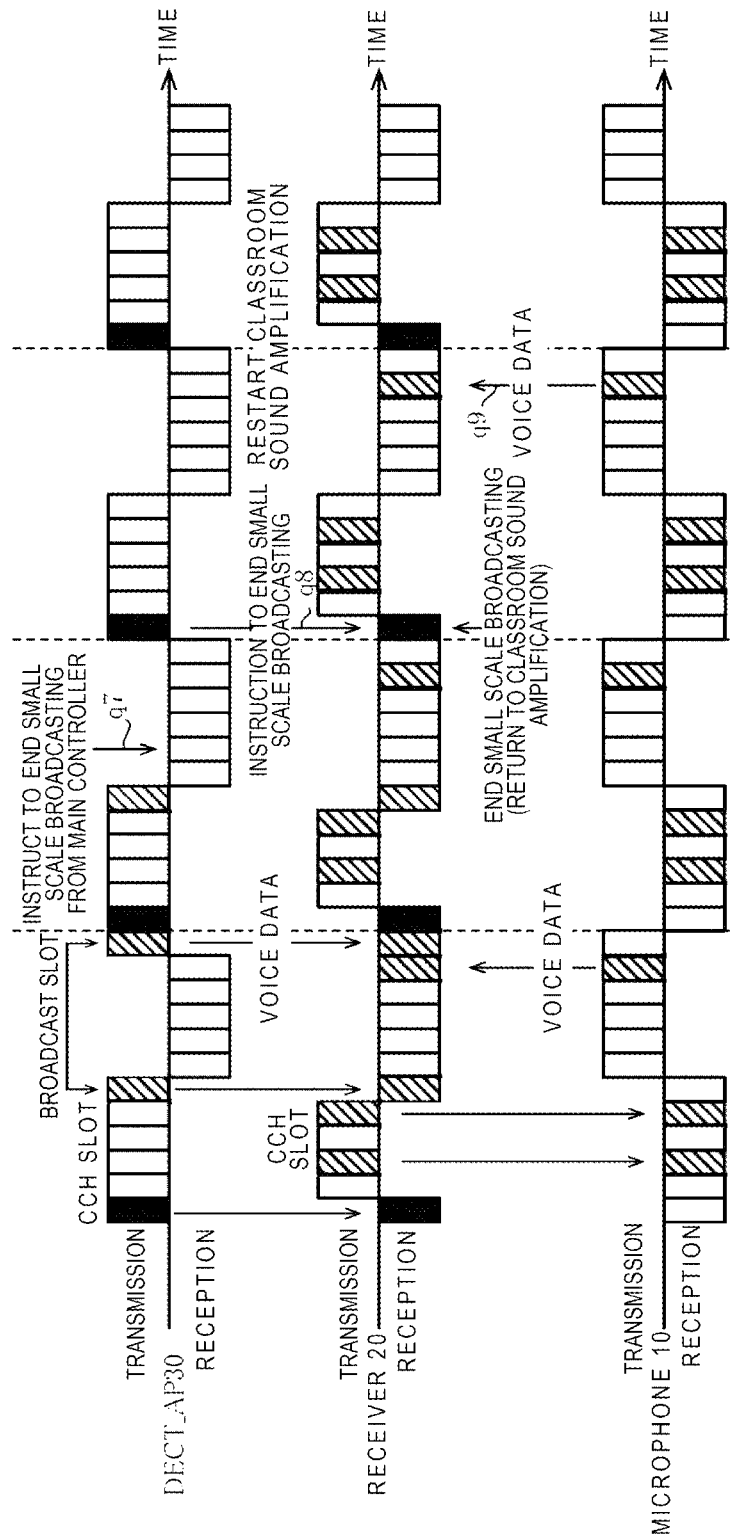
FIG. 18 is a timing chart showing a slot configuration example when the operational mode is returned to the classroom sound amplification from the small scale broadcasting according to the exemplary embodiment.

FIG. 18 is a timing chart showing a slot configuration example when the operational mode is returned to the classroom sound amplification from the small scale broadcasting. A process of FIG. 18 may be performed after the process of FIG. 17, and may be performed when the operational mode is changed from the small scale broadcasting to the classroom sound amplification.

For example, DECT_AP 30 receives an instruction to end the small scale broadcasting from main controller 40 during the transmitting of the voice data of the broadcast communication (small scale broadcasting) using a sixth transmission slot and a transmission slot inverted from a sixth reception slot (see symbol q7).

For example, DECT_AP 30 transmits the instruction to end the small scale broadcasting to receiver 20 using a first transmission slot. When receiving the instruction to end the small scale broadcasting in a reception slot inverted from a first transmission slot, receiver 20 ends the small scale broadcasting, and changes the operational mode by returning to the classroom sound amplification (see symbol q8).

When the operational mode is returned to the classroom sound amplification, microphone 10 transmits voice data to receiver 20 using, for example, a fifth reception slot. For example, when receiving the voice data from microphone 10 using the fifth reception slot, receiver 20 reproduces the voice data to output the voice data as a voice from speaker 27 (see symbol 9).

As mentioned above, control unit 25 of receiver 20 can appropriately change a processing method within receiver 20 to process data by changing the operational mode from the classroom sound amplification to the small scale broadcasting or by changing the operational mode from the small scale broadcasting to the classroom sound amplification.

Intercom Communication During Classroom Sound Amplification

Figure 19:
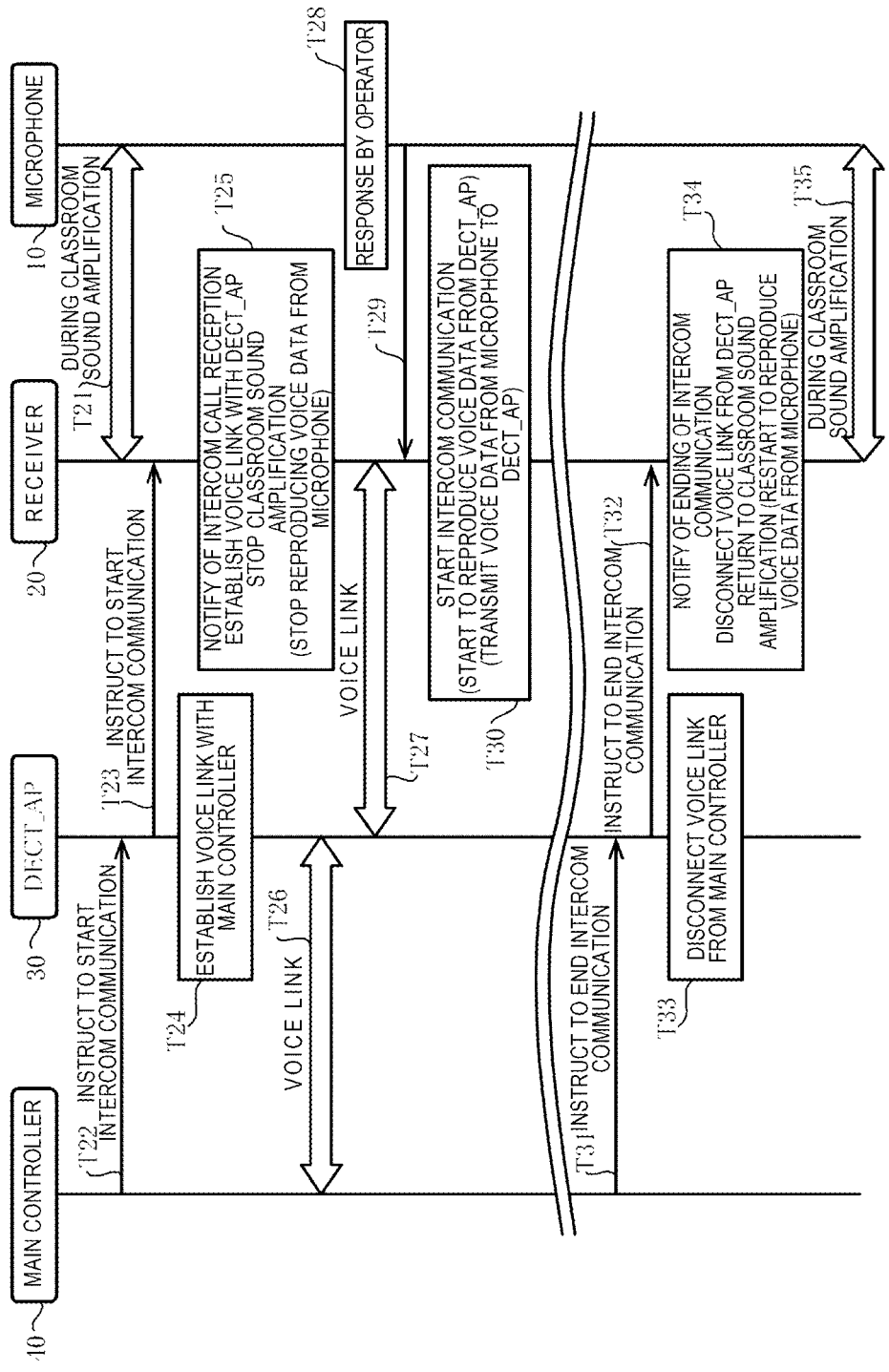
FIG. 19 is a sequence diagram showing an example of the flow of the intercom communication during the classroom sound amplification according to the exemplary embodiment.

FIG. 19 is a sequence diagram showing an example of the flow of the intercom communication during the classroom sound amplification.

During the classroom sound amplification between microphone 10 and receiver 20 (T21), main controller 40 instructs DECT_AP 30 to start the intercom communication (T22). In this case, DECT_AP 30 instructs receiver 20 to start the intercom communication (T23), and establishes a voice link with main controller 40 (T24 and T26). The voice link is an example of a wireless link.

When receiver 20 receives the instruction to start of the intercom communication, control unit 25 changes the operational mode from the classroom sound amplification to the intercom communication. Receiver 20 informs of intercom communication call reception from speaker 27, and establishes a voice link with DECT_AP 30 (T25 and T27). Receiver 20 stops the classroom sound amplification, and stops reproducing the voice data from microphone 10.

When receiving a response for the intercom communication call reception from the operator (T28), microphone 10 transmits voice data of microphone 10 to receiver 20 (T29).

Receiver 20 reproduces voice data received from main controller 40 via the voice link, and starts to output the voice data from main controller 40 (T30).

Receiver 20 reproduces voice data from DECT_AP 30, outputs a voice from speaker 27, and transmits the voice data from microphone 10 to DECT_AP 30 (T30).

Main controller 40 receives the voice data of microphone 10 from DECT_AP 30, and outputs the received voice data as a voice from speaker 47.

For example, when receiving an instruction to end the intercom communication from the administrator through an operation unit (not shown), main controller 40 transmits an instruction to end the intercom communication to DECT_AP 30 (T31).

DECT_AP 30 transmits the instruction to end the intercom communication to receiver 20 (T32), and disconnects the voice link from main controller 40 (T33).

When receiver 20 receives the instruction to end the intercom communication, control unit 25 changes the operational mode from the intercom communication to the classroom sound amplification. In this case, receiver 20 informs of the ending of the intercom communication from speaker 27, and disconnects the voice link from DECT_AP 30 (T34).

Receiver 20 returns the operational mode to the classroom sound amplification, that is, reproduces the voice data from microphone 10 to output a voice from speaker 27. Thus, microphone 10 and receiver 20 perform the classroom sound amplification (T35).

Change from Classroom Sound Amplification to Intercom Communication

Figure 20:
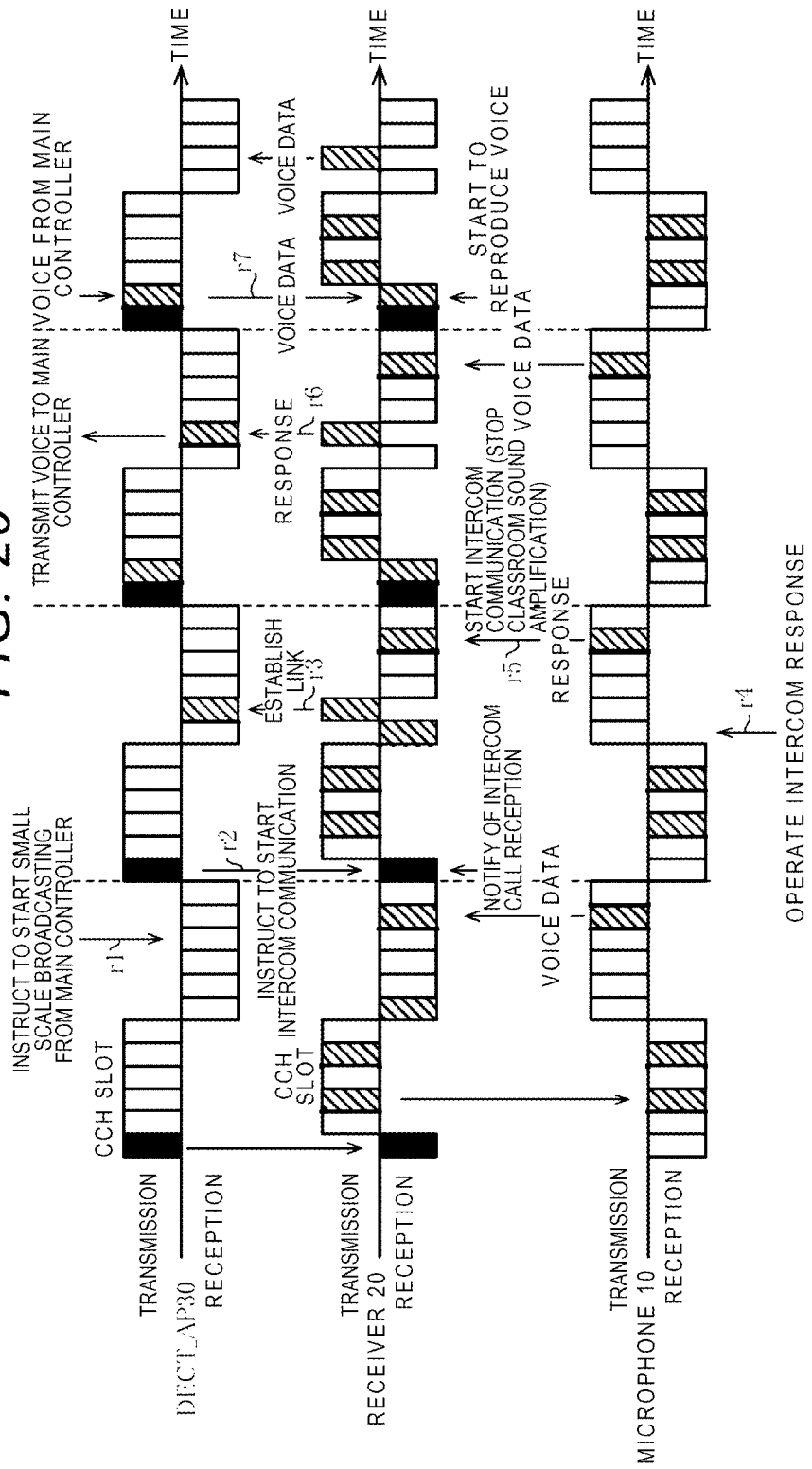
FIG. 20 is a timing chart showing a slot configuration example when the operational mode is changed to the intercom communication from the classroom sound amplification according to the exemplary embodiment.

FIG. 20 is a timing chart showing a slot configuration example when the operational mode is changed from the classroom sound amplification to the intercom communication. In the classroom sound amplification shown in FIG. 20, a fifth transmission slot of microphone 10 and a fifth reception slot of receiver 20 are used.

During the classroom sound amplification, when receiving an instruction to start the intercom communication from main controller 40 (see symbol r1), DECT_AP 30 transmits the instruction to start the intercom communication to receiver 20 using a first CCH communication slot (see symbol r2).

Receiver 20 inverts a first transmission slot to a reception slot, and receives the instruction to start the intercom communication in the inverted slot. For example, receiver 20 inverts a second reception slot to a transmission slot, and establishes a voice link with DECT_AP 30 using the inverted slot (see symbol r3).

For example, when receiving a response operation for the intercom communication from the operator (see symbol r4), microphone 10 transmits a response to receiver 20 using a fifth transmission slot (see symbol r5). When receiving the intercom communication response using a fifth reception slot, receiver 20 stops the classroom sound amplification, and changes the operational mode to start the intercom communication. For example, receiver 20 transmits the response to DECT_AP 30 using a transmission slot inverted from a second reception slot (see symbol r6).

For example, when receiving the response of the intercom communication from receiver 20 using the second reception slot, DECT_AP 30 transmits voice data from microphone 10 to main controller 40. When receiving the voice data from microphone 10, main controller 40 outputs a voice from speaker 47.

For example, DECT_AP 30 transmits the voice data from main controller 40 to receiver 20 using a second transmission slot (see symbol r7). For example, receiver 20 receives the voice data from maim controller 40 using a reception slot inverted from the second transmission slot, and outputs the voice data as a voice from speaker 27.

Return to Classroom Sound Amplification from Intercom Communication

FIG. 21 is a timing chart showing a slot configuration example when the operational mode is returned to the classroom sound amplification from the intercom communication. A process of FIG. 21 may be performed after the process of FIG. 20, or may be performed when the operational mode is changed from the intercom communication to the classroom sound amplification.

For example, receiver 20 receives voice data from main controller 40 using a reception slot inverted from the second transmission slot, and outputs the received voice data from speaker 27 as a voice (see symbol u1).

For example, receiver 20 transmits the voice data from microphone 10 to DECT_AP 30 using a transmission slot inverted from a second reception slot (see symbol u2).

DECT_AP 30 transmits the voice data from microphone 10 to main controller 40. When receiving the voice data from microphone 10, main controller 40 outputs the received voice data as a voice from speaker 47.

For example, receiver 20 receives an instruction to end the intercom communication by main controller 40 from DECT_AP 30 using a reception slot inverted from a second transmission slot (see symbol u3). In this case, receiver 20 informs of the ending of the intercom communication from speaker 27, and ends the intercom communication. Receiver 20 changes the operational mode by returning to the classroom sound amplification using, for example, a fifth reception slot (see symbol u4).

As mentioned above, control unit 25 of receiver 20 can appropriately change a processing method within receiver 20 to process data by changing the operational mode from the classroom sound amplification to the intercom communication or by changing the operational mode from the intercom communication to the classroom sound amplification.

In the infrared microphone system described in Japanese Patent Unexamined Publication No. 2002-223491, since the infrared rays do not reach beyond the wall of the classroom, it is necessary to provide a receiver and a control device in each classroom. Further, it is necessary to lay a cable in each classroom.

In contrast, in microphone system 5, since the respective devices perform wireless communication that does not use infrared rays, it is possible to perform communication between different classrooms. Here, receiver 20 communicates with DECT_AP 30 using the slave-device ID in a wireless manner such as DECT, communicates with microphone 10 using the master-device ID in a wireless manner such as DECT, and communicates the voice data.

It is possible to reduce the number of wirings (for example, LAN cable) that connect the respective classrooms and main controller in the related art by providing DECT_AP 30. Accordingly, since wirings between the respective classrooms are not needed, it is possible to reduce wiring provision costs.

Since receiver 20 holds both of the master-device ID and the slave-device ID, it is possible to realize communication between microphone 10, receiver 20 and DECT_AP 30 with a simple configuration. Microphone 10 can be connected to both of DECT_AP 30 and receiver 20. That is, receiver 20 performs transmission and reception, and functions as a repeater.

As compared to the case where the communication is performed using infrared rays in the related art, since wireless communication such as DECT is performed, interruption of communication due to, for example, external light is reduced, and thus, the communication can be performed beyond the wall of the classroom.

For example, receivers 20 may be respectively provided individually in the respective classrooms, and one DECT_AP 30 may be provided for the multiple receivers in a corridor outside the classroom. Thus, it is possible to simplify the configuration of microphone system 5 as compared to the case where one DECT_AP 30 is provided for one receiver 20.

Since receiver 20 changes the operational mode in response to the instruction from DECT_AP 30, it is possible to utilize microphone system 5 in various cases of using (for example, sound amplification, intercom communication, small scale broadcasting, or a combination of these cases).

Although various exemplary embodiments have been described with reference to the drawings, the present invention is not limited to the embodiments. It should be apparent to those skilled in the art that various changes or modifications can be conceived within the scope described in the appended claims, and it should be understood that such changes or modifications are included in the technical scope of the present invention.

In the exemplary embodiment, it has been primarily described that the microphone and the receiver are connected and the receiver and the DECT_AP are connected in a wireless manner such as DECT. The microphone and the receiver may be wirelessly connected and the receiver and the DECT_AP may be wirelessly connected in a wireless manner (for example, wireless LAN, 2.4-GHz band digital cordless, or PHS) other than DECT, and may perform wireless communication.

In the aforementioned exemplary embodiment, it has been primarily described that microphone 10 communicates with receiver 20, but microphone 10 may communicate with DECT_AP 30. For example, when receiver 20 is busy, microphone 10 may be directly connected to DECT_AP 30.

In the aforementioned exemplary embodiment, although it has been primarily described that a slot used by receiver 20 is inverted, a slot used by DECT_AP 30 may be inverted. The inverting of the slot of DECT_AP 30 is performed by wireless control unit 32.

In the aforementioned exemplary embodiment, microphone 10 as a transmitter that transmits data has been primarily described, but a transmitter (for example, a camera that transmits data including image data and video data) may be used. The camera may be, for example, a camera with a shutter. For example, it is possible to secure security and privacy within the classroom by providing the camera with a shutter.

In the aforementioned exemplary embodiment, although the voice data has been described as the actual data, image data or video data may be used.

The present invention is applicable to a wireless communication system and a receiver that can realize communication between devices provided in different regions that are spatially partitioned with a simple configuration.

What is claimed is:

1. A wireless communication system in which transmitters that transmit data, receivers that receive data, and repeaters that relay data communicate with one another in a wireless manner by exchanging identification information items thereof,
    wherein the transmitter includes a first communication unit that wirelessly communicates with the receiver by using first slave-device identification information for performing communication as a slave device of the receiver,
    the receiver includes a second communication unit that wirelessly communicates with the transmitter by using first master-device identification information for performing communication as a master device of the transmitter, and that wirelessly communicates with the repeater by using second slave-device identification information for performing communication as a slave device of the repeater,
    the repeater includes a third communication unit that wirelessly communicates with the receiver by using second master-device identification information for performing communication as a master device of the receiver,
    the wireless communication is wireless communication of a time division system,
    the receiver includes a first synchronization unit that performs synchronization with the transmitters,
    the repeater includes a second synchronization unit that performs synchronization with the receivers,
    the second communication unit of the receiver transmits a plurality of control data items for performing slot synchronization to the transmitters that are wirelessly connected to the receiver at one time,
    the third communication unit of the repeater transmits a plurality of control data items for performing slot synchronization to the receivers that are wirelessly connected to the repeater at one time,
    the second communication unit of the receiver transmits combination data in which the control data and information data are combined to the transmitter that is wirelessly connected to the receiver, and
    the control data includes information on a transmission destination of the information data.

2. The wireless communication system of claim 1,
    wherein the first master-device identification information includes the same master-device information as in the second master-device identification information, the first slave-device identification information includes the same slave-device information as in the second slave-device identification information, and the master-device information and the slave-device information include information that is determined by the transmitter.

3. The wireless communication system of claim 1, wherein the second communication unit of the receiver communicates data by using a slot in a predetermined position,
the slot includes transmission slots and reception slots that are periodically repeated, and
the second communication unit of the receiver inverts a part of the transmission slots to a reception slot, or inverts a part of the reception slots to a transmission slot, and communicates data with the repeater by using the inverted slot.

4. The wireless communication system of claim 3, further comprising:
an information processing device that performs broadcast communication of data with the plurality of receivers through the repeater,
wherein the second communication unit of the receiver inverts a part of the transmission slots to a reception slot for broadcast communication, and receives broadcast data from the repeater by using the inverted slot, or the third communication unit of the repeater inverts a part of the reception slots to a transmission slot for broadcast communication, and transmits broadcast data to the plurality of receivers by using the inverted slot.

5. The wireless communication system of claim 3, wherein the second communication unit of the receiver inverts a part of the reception slots to a transmission slot, and transmits information data to the repeater by using the inverted slot, and
the third communication unit of the repeater transmits the information data to the receiver by using a transmission slot.

6. The wireless communication system of claim 1, wherein the second communication unit of the receiver receives the data from the transmitter, and receives an instruction on a method of processing the data from the repeater, and
the receiver includes a control unit that processes the data from the transmitter in response to the instruction on the processing method.

7. The wireless communication system of claim 1, wherein the data includes voice data or image data.

8. The wireless communication system of claim 1, wherein one receiver is provided in a region that is spatially partitioned, and
one repeater is provided for the plurality of receivers.

9. A wireless communication system in which transmitters that transmit data, receivers that receive data, and repeaters that relay data communicate with one another in a wireless manner by exchanging identification information items thereof,
wherein the transmitter includes a first communication unit that wirelessly communicates with the receiver by using first slave-device identification information for performing communication as a slave device of the receiver,
the receiver includes a second communication unit that wirelessly communicates with the transmitter by using first master-device identification information for performing communication as a master device of the transmitter, and that wirelessly communicates with the repeater by using second slave-device identification information for performing communication as a slave device of the repeater,
the repeater includes a third communication unit that wirelessly communicates with the receiver by using second master-device identification information for performing communication as a master device of the receiver,
the second communication unit of the receiver communicates data by using a slot in a predetermined position,
the slot includes transmission slots and reception slots that are periodically repeated,
the second communication unit of the receiver inverts a part of the transmission slots to a reception slot, or inverts a part of the reception slots to a transmission slot, and communicates data with the repeater by using the inverted slot,
the third communication unit of the repeater transmits a plurality of control data items for performing slot synchronization to the receivers that are wirelessly connected to the repeater at one time, and
the second communication unit of the receiver transmits combination data in which the control data and information data are combined to the transmitter that is wirelessly connected to the receiver.

10. The wireless communication system of claim 9, wherein the first master-device identification information includes the same master-device information as in the second master-device identification information, the first slave-device identification information includes the same slave-device information as in the second slave-device identification information, and the master-device information and the slave-device information include information that is determined by the transmitter.

11. The wireless communication system of claim 9, wherein the wireless communication is wireless communication of a time division system,
the receiver includes a first synchronization unit that performs synchronization with the transmitters, and
the repeater includes a second synchronization unit that performs synchronization with the receivers.

12. The wireless communication system of claim 11, wherein the second communication unit of the receiver transmits a plurality of control data items for performing slot synchronization to the transmitters that are wirelessly connected to the receiver at one time.

13. The wireless communication system of claim 9, wherein the second communication unit of the receiver receives the data from the transmitter, and receives an instruction on a method of processing the data from the repeater, and
the receiver includes a control unit that processes the data from the transmitter in response to the instruction on the processing method.

14. The wireless communication system of claim 9, wherein the data includes voice data or image data.

15. The wireless communication system of claim 9, wherein one receiver is provided in a region that is spatially partitioned, and
one repeater is provided for the plurality of receivers.

* * * * *